United States Patent
Hu et al.

(10) Patent No.: US 7,610,465 B2
(45) Date of Patent: Oct. 27, 2009

(54) METHOD AND RELATED APPARATUS FOR DATA MIGRATION UTILIZING DISK ARRAYS

(75) Inventors: Guoyu Hu, Taipei Hsien (TW); Xingliang Zou, Taipei Hsien (TW)

(73) Assignee: VIA Technologies Inc., Hsin-Tien, Taipei Hsien (TW)

(*) Notice: Subject to any disclaimer, the term of this patent is extended or adjusted under 35 U.S.C. 154(b) by 379 days.

(21) Appl. No.: 11/160,816

(22) Filed: Jul. 11, 2005

(65) Prior Publication Data

US 2006/0112221 A1 May 25, 2006

(30) Foreign Application Priority Data

Nov. 19, 2004 (TW) .............................. 93135767 A

(51) Int. Cl.
*G06F 12/00* (2006.01)
*G06F 12/16* (2006.01)

(52) U.S. Cl. ................. 711/165; 711/162; 711/114

(58) Field of Classification Search ........... 711/114, 711/165, 162
See application file for complete search history.

(56) References Cited

U.S. PATENT DOCUMENTS

| 5,442,752 A * | 8/1995 | Styczinski ............... 711/4 |
| 5,511,177 A * | 4/1996 | Kagimasa et al. ........ 711/114 |
| 6,732,230 B1 * | 5/2004 | Johnson et al. .......... 711/114 |
| 2004/0210731 A1 * | 10/2004 | Chatterjee et al. ...... 711/165 |

* cited by examiner

*Primary Examiner*—Reginald G Bragdon
*Assistant Examiner*—Victor W Wang
(74) *Attorney, Agent, or Firm*—Winston Hsu

(57) ABSTRACT

Method and related apparatus for data migration of a disk array. While striping and migrating data of a source disk of the disk array, data stripes are grouped into different zones; after completely writing data stripes of a given zone to disks of the disk array, data stripes of next zone are written to disks of the disk array and the given zone. Because data stripes of the next zone will be distributed to various disks, only some of the data stripes will overwrite data stripes of the given zone. Therefore, the next zone can contain more data stripes than the given zone while keeping migration integration. In addition, by zones containing increasing number of data stripes, migration progress can be managed with ease and high efficiency achieving better data throughput.

10 Claims, 27 Drawing Sheets

Before data migration

| Zone | Number of groups | Number of data stripes |
|---|---|---|
| $Z(0)$ | 1 | 2 |
| $Z(1)$ | 1 | 2 |
| $Z(2)$ | 2 | 4 |
| $Z(3)$ | 4 | 8 |
| $Z(4)$ | 8 | 16 |
| $Z(5)$ | 16 | 32 |
| ⋮ | ⋮ | ⋮ |
| $Z(j)$ | $2^{(j-1)}$ | $2^j$ |
| ⋮ | ⋮ | ⋮ |

Fig. 5

| Zone | Number of groups | Number of data stripes |
|---|---|---|
| $Z(0)$ | 1 | $N$ |
| $Z(1)$ | $N-1$ | $(N-1)*N$ |
| $Z(2)$ | $(N-1)*N$ | $(N-1)*(N^2)$ |
| $Z(3)$ | $(N-1)*(N^2)$ | $(N-1)*(N^3)$ |
| ⋮ | ⋮ | ⋮ |
| $Z(j)$ | $(N-1)*(N^j)/N$ | $(N-1)*(N^j)$ |
| ⋮ | ⋮ | ⋮ |

Fig. 16

| Zone | Number of groups | Number of data stripes |
|---|---|---|
| Z(0) | 1 | Q |
| Z(1) | Q-1 | (Q-1)*Q |
| Z(2) | (Q-1)*Q | (Q-1)*(Q^2) |
| Z(3) | (Q-1)*(Q^2) | (Q-1)*(Q^3) |
| ... | ... | ... |
| Z(j) | (Q-1)*(Q^j)/Q | (Q-1)*(Q^j) |
| ... | ... | ... |

RAID0 : Q = number of disks
RAID0+1 : Q = (number of disks)/2
RAID5 : Q = (number of disks −1)

Fig. 21

METHOD AND RELATED APPARATUS FOR DATA MIGRATION UTILIZING DISK ARRAYS

BACKGROUND OF INVENTION

1. Field of the Invention

The invention relates to a method and related apparatus for performing data migration operations utilizing a disk array, and more particularly, to a method and related apparatus for performing data migration operations utilizing a disk array through a migration procedure including management of records and an optimized data access method which can increase the migration efficiency while at the same time ensuring the safety of the migration.

2. Description of the Prior Art

Computer systems are a hardware foundation of today's information society. Data, information, and knowledge can be managed, processed, and stored by the computer system. The information products provider utilizes all kinds of techniques to enable the computer systems to store more data and access the data more quickly.

Generally speaking, the current computer system comprises one hard disk that serves as a nonvolatile storage device. As their cost has become less expensive, hard disks have become a common means to build a disk array. A typical disk array comprises the computer system and a plurality of hard disks. Many techniques are utilized today for building various types of disk array structures. Disk array structures have been developed, such as: redundant array of inexpensive disks (RAID0, RAID1, . . . RAID5, and RAID0+1) and matrix RAID structures. These RAID structures can utilize different methods to integrate individual memory spaces of the hard disks into a memory space so that the RAID structures have advantages of data access and data management. For example, in a disk array utilizing a RAID0 technique, one data to be stored into the disk array is divided into multiple data stripes. Different data stripes are written into different hard disks of the disk array in a striping manor that is well know to those of ordinary skills in the art therefore further details of the striping method will be omitted for brevity. Furthermore, when the data is later read from the disk array, the data stripes are read simultaneously from different hard disks then reassembled into the original data. In other words, if one data is accessed from the disk array, only a part of the data (i.e., the data stripe) is accessed from each hard disk. Better data accessing efficiency and performance is achieved due to the simultaneous disk access of the data strip. Another example, in a disk array of RAID5, in addition to the above-mentioned characteristic of separately storing data stripes into different disk arrays, a parity data is also stored. The parity data can allow the disk array not only to access data more quickly, but adds the benefit of providing a method to check whether the stored data is damaged. Moreover, this can allow the disk array to repair the damaged data utilizing a repair technique that results in the original correct data.

The disk array has the above-mentioned advantages; unfortunately, because the disk array's cost is greater, most of the current computer systems comprise only a single hard disk. The disk array can be established, at the users option, if needed. Furthermore, when the disk array is established the user must perform a series of setup steps. These steps include: additional hard disks must be added to the computer system, the users must perform a data migration operation, data stored in the original hard disk must be read and then stored into the new disk array according to the needs of the RAID structure. Therefore, it is one of the key points that the information products providers help the users perform the above-mentioned data migration. In the prior art, the information products provider such as, Intel Corporation, has disclosed a data migration program of a disk array of RAID0. If the user executes this data migration program in the computer system then the data migration can be performed completely.

Unfortunately, the prior art data migration programs have poor performance. That is, the data migration programs require a lot of time to complete the data migration; the application is also limited to providing only for RAID0. Therefore, the data migration program may not support disk arrays of other data structures (e.g., RAID5, etc.).

SUMMARY OF INVENTION

It is therefore one of primary objectives of the claimed invention to provide a data migration method and related apparatus which have a better performance and more applications, and can maintain the data migration safety, to solve the above-mentioned problem.

As mentioned above, in the disk array structure, the data is divided into data units called stripes. The data is then stored in each hard disk in stripes. When an original disk (i.e., a disk that is not part of a disk array) is updated to a disk array, the original hard disk can be regarded as a source disk, and the other disks of the disk array can be regarded as the member disks. The purpose of data migration is to divide the stored data of the original hard disk into multiple data stripes and to store the data stripes into each hard disk of the newly created disk array (i.e., comprising the source disk and member disks). This process is completed according to the disk array structure. When the data migration is performed, in addition to the data access, the safety of the data during the data migration is also of concerned. That is, the data migration process may be interrupted due to a power failure. It is possible for the data migration to continue correctly without losing any data or damaging any data because of the interruption. In the claimed invention, however, a better data migration management/record is utilized to improve the performance of the data migration and maintain data migration safety, and better accessing management is utilized to raise the efficiency of data migration and shorten time needed for the data migration.

When the data migration management procedure is performed in the claimed invention, the data stripes to be migrated from the source disk are orderly arranged in each zone. Each zone comprises a plurality of data stripes to be written into different hard disks in the array. When the claimed invention performs the data migration, the zone is utilized as a unit to be executed. After the claimed invention smoothly writes the data stripes in $j^{th}$ zone of the source disk into each hard disk of the disk array, the $j^{th}$ zone can be regarded as a rewritable zone. When the data stripes in $(j+1)^{th}$ zone are continuously migrated, some of the data stripes, which are to be written into the source disk, in $(j+1)^{th}$ zone can be written into the $j^{th}$ zone. The number of data stripes to be written into the source disk is smaller then the number of all the data stripes of the zone because data stripes in a zone are to be written into different hard disks of the disk array. Therefore, the size of the next zone (this also applies to the number of the data stripes) may be larger than the size of the zone.

For example, the data migration is performed in a RAID0 disk array comprising two hard disks. The claimed invention builds each zone of the source disk to have an even number of data stripes. Half of the data stripes are then written into the source disk while the other half are written into another hard disk. In this situation, if the $j^{th}$ zone comprises 2*M data stripes, the $(j+1)^{th}$ zone can comprise 4*M data stripes when all the data stripes in the $j^{th}$ zone are migrated completely. This means that M data stripes are written into the $(j-1)^{th}$ zone of the source disk and the other M data stripes are written into the member disk. Further, the other 2*M data stripes to be written into the source disk can be written into the jth zone overwriting the original 2*M data stripes in the jth zone. Therefore, the (j+2)th zone can comprise 8*M data stripes, the (j+3)th zone can comprise 16*M data stripes, and so on. In other words, under the data migration procedure arrangement of the claimed invention, the size of different zone (i.e., the number of the data stripes) can be increased utilizing an index number until the size of the zone reaches an appropriate threshold.

The above-mentioned data migration procedure arrangement can be described as follows. The claimed invention respectively stores an initial data in each hard disk of the disk array for recording an initial address of the zone to be migrated. For example, when the data stripes of the $j^{th}$ zone are being migrated, the initial data stores the initial address of the $j^{th}$ zone. As each of the data stripes of the $j^{th}$ zone are written into each hard disk of the disk array, the initial data is updated as the initial address of the $(j+1)^{th}$ zone. This means that the data stripes in the $j^{th}$ zone can be overwritten and the data stripes in the $(j+1)^{th}$ zone can start to be migrated. Therefore, the data stripes in the (j+1)th zone, which are to be written into the source disk, start to be written into the jth zone and the other data stripes to be written into other member disks start to be written into corresponding member disks. Before all the data stripes in the (j+1)th zone are written into corresponding disks, the initial data is not updated so that the initial data can store the initial address of the $(j+1)^{th}$ zone. Until all the data stripes in the $(j+1)^{th}$ zone are completely migrated, the initial data is updated as the initial address of the $(j+2)^{th}$ zone. This procedure ensures that the data migration is going to the $(j+2)^{th}$ zone. It also indicates that the data stripes in the $(j+1)^{th}$ zone can be overwritten.

In other words, the initial data points to the zone being migrated. The data stripes in this zone are not overwritten, however, another zone before this zone can be overwritten. Unless all of the data stripes are already written into each disk precisely, the initial data is not updated. This can protect the data stripes of the zone. Furthermore, as mentioned above, until all the data stripes in the zone are written into corresponding disks, the initial data is updated to point to next zone and the original zone can be changed to be a rewritable zone.

The claimed invention utilizes the above-mentioned management mechanism to maintain the safety of data migration. For example, when the data stripes are being written into corresponding disks, the data migration may be suddenly be interrupted, for example, due to a power failure. Once the electricity is restored and the data migration continues, the claimed invention can start the data migration from the $(j+1)^{th}$ zone according to the initial address stored in the initial data. In other words, the claimed invention can write all the data stripes in the $(j+1)^{th}$ zone into corresponding disks. Because the data migration is interrupted when the $(j+1)^{th}$ zone is migrated, the initial data stores the initial address of the $(j+1)^{th}$ zone. Therefore, the data migration can be performed again form the $(j+1)^{th}$ zone. Furthermore, because the initial data points to the $(j+1)^{th}$ zone, after the data migration is performed again, all the data stripes in the $(j+1)^{th}$ zone are not overwritten. This ensures that the data in the $(j+1)^{th}$ zone is not destroyed or lost.

Please note, in the claimed invention, even when the size of the zone is increased the above-mentioned data migration procedure mechanism can still ensure the safety of the data migration. In fact, the required amount of updating the initial data can be reduced because the zone division is larger. This can raise the efficiency of the data migration in the claimed invention. During an electricity failure, because the initial data must store the initial address, a reasonable choice is to store the initial data in each disk of the disk array so that the initial data can be stored permanently. However, the initial data is updated when each zone is completely migrated, so if each zone is small (i.e., the number of the data stripes is small), this means that the initial data will be updated frequently during the data migration. Therefore, the efficiency is reduced. Fortunately, the claimed invention allows the size of the zone to be increased. Larger zones can reduce the required times of updating the initial data. In other words, the claimed invention not only ensures the safety of the data migration but also raises the efficiency of the data migration.

In addition, the claimed invention utilizes optimized access management to raise the efficiency of the data migration. When the data is migrated from the source disk to each disk of the disk array the claimed invention provides efficiency savings. The data stripe to be migrated is firstly read from the source disk and then written into each disk of the array. As known by those skilled in the art, controlling data access by the disk involves sending a read or write-in command to the disk. In current command format, the access command has a limitation of accessing data. For example, in the ATA command, a read command can at most control a disk to read 128 k-byte data from the disk, and a write-in command is at most utilized to write a 128-byte data into a disk. Sending the read/write-in commands requires significant time and system resources. It is better to efficiently utilize every read/write-in command to access data to reduce the total number of read/write commands. The opportunity to send a reduced number of commands is ignored in the prior art because of the disk array structure. For example, in the prior art, if we have to migrate 256-byte data in a RAID0 disk array having two hard disks, a 128 k-byte read command is firstly sent to the source disk. Then, the 128 k-byte data is divided into two 64 k-byte parts and the two write-in commands are sent to write the two 64 k-byte parts into two disks. Similarly, next another 128 k-byte read command is sent to the other 128 k-byte data, and two write-in commands are sent to write two 64 k-byte data of the 128 k-byte data into two disks. As mentioned above, migrating 256 k-byte data requires six read/write-in commands.

In contrast to the prior art, the claimed invention optimized access mechanism first repeats the read commands to read enough data to write more data in the following write-in command. Therefore, the claimed invention can sufficiently utilize each write-in command. Similarly, when migrating 256 k-byte data in a RAID0 disk array having two disks, the claimed invention first to sends two 128 k-byte read commands to read the whole 256 k-byte data, and then sends two 128 k-byte write-in commands to write two parts of the 256 k-byte data into two disks. Therefore, it only needs to send four read/write-in commands three times to completely perform the data migration of 256 k-bytes of data. To sum up, the claimed invention can utilize the optimized access mechanism to raise the efficiency of data migration while also reducing the consumption of the system resources.

Please note that the claimed invention, in additional to the above-mentioned data migration of RAID0, can also utilized in other types of disk array structure (such as RAID0+1, RAID5 or other RAID structure) to perform data migration with high efficiency, low time consumption, and higher security.

These and other objectives of the present invention will no doubt become obvious to those of ordinary skill in the art after reading the following detailed description of the preferred embodiment that is illustrated in the various figures and drawings.

BRIEF DESCRIPTION OF DRAWINGS

FIG. 4 and FIG. 5 illustrate data migration management of the disk array shown in FIG. 3 according to the present invention.

FIG. 15 and FIG. 16 are diagrams illustrating the data migration procedure management of the disk array shown in FIG. 14 according to the present invention.

FIG. 21 is a diagram illustrating the data migration access management of disk arrays of different disk array structures according to the present invention.

DETAILED DESCRIPTION

Figure 1:
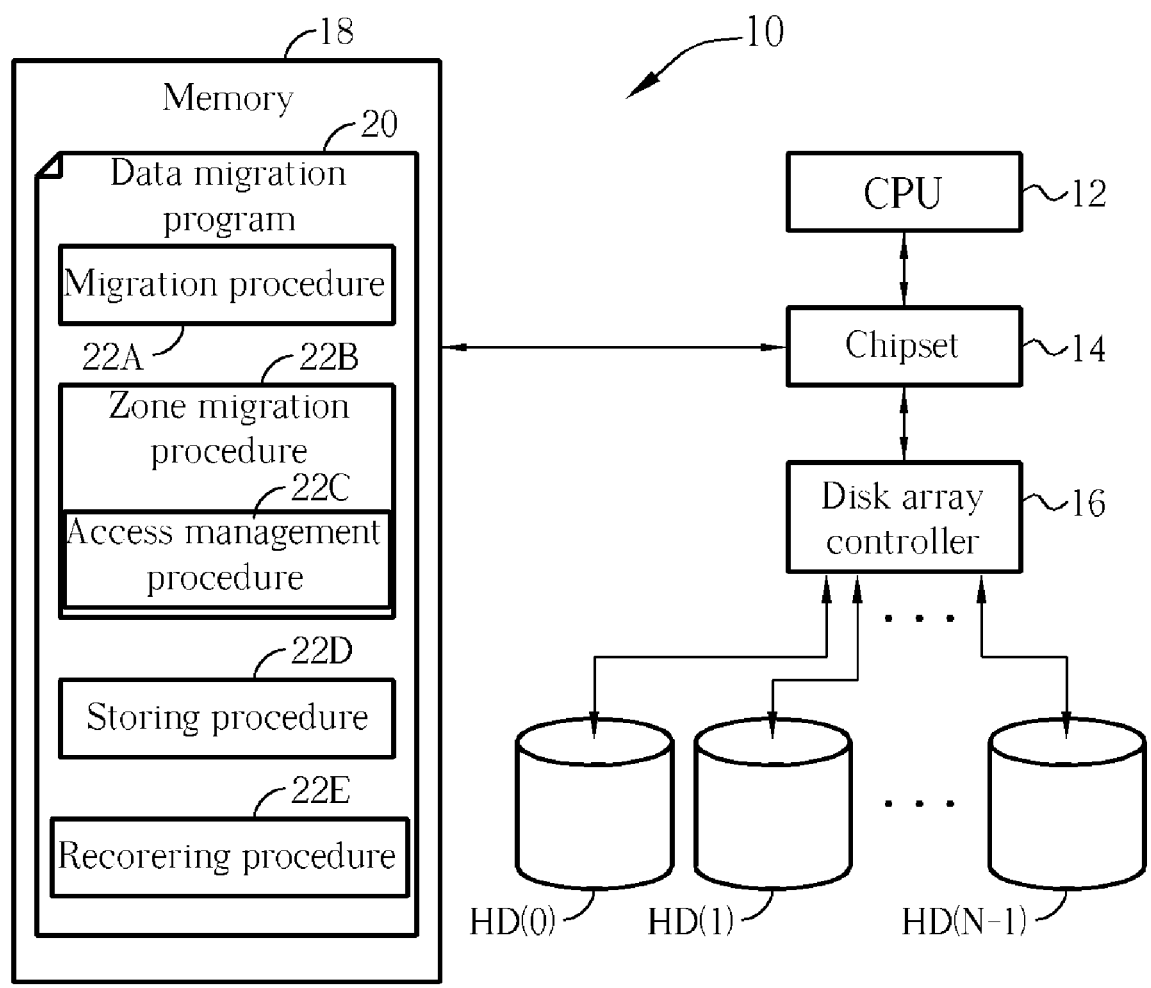
FIG. 1 is a diagram of a computer system of an embodiment according to the present invention.

Please refer to FIG. 1, which is a diagram of a computer system 10 of an embodiment according to the present invention. The computer system 10 comprises a central processing unit (CPU) 12, a chipset 14, a disk array controller 16, a memory (e.g., a dynamic random access memory) 18, and a plurality of hard disks HD(0), HD(1), ..., HD(N-1). The CPU 12 can execute programs, process data, calculate data, and control the operation of the computer system 10. The memory 18 is utilized to temporarily store the program codes and related data during the operation of the CPU 12. The disk array controller 16 comprises a plurality of bus channels, where each bus channel is connected to a disk so that the disk array controller 16 can integrate and control the data access of these disks. Furthermore, the disk array controller 16 can therefore organize these disks as a disk array. The chipset 14 is utilized to manage data transmissions among the CPU 12, the memory 18, and the disk array controller 16 or other peripheral circuits. Please note, the disk array controller 16 and the chipset 14 can be integrated into a single device or the disk array controller 16 can be a subcard (e.g., a PCI card, wherein PCI is peripheral communication interconnect) connected to the chipset 14 through a specific interface (e.g., a PCI interface) of the subcard.

In the computer system 10 shown in FIG. 1, the present invention can be implemented by a data migration program. In other words, when the user wants to utilize the disk array to replace a single disk, the user can control the computer system 10 to control the CPU to execute a data migration program 20 stored in the memory 18. Therefore, the computer system 10 can migrate the data stored in the original disk (i.e., the source disk) to each disk of the disk array according to the disk array structures (e.g., such as RAID0, RAID0+1, or RAID5, ...). In addition, the data migration program 20 can comprise a migration procedure 22A, a zone migration procedure 22B, an access management procedure 22C, a storing procedure 22D, and a recovering procedure 22E. The migration procedure 22A is utilized to manage the procedure of the data migration. In the present invention, the data to be migrated from the source disk is divided into different zones and the zone is utilized as a unit to perform the data migration. After all the data in the zone is completely migrated migration of the data of the next zone begins. Furthermore, different zones can comprise different memory spaces. The migration procedure 22A can be utilized to determine the size of each zone. When executing the zone migration procedure 22B the CPU 12 sends a read/write-in command to each disk through the chipset 14 or directly through the disk array controller 16 to migrate the data in a specific zone. When executing the zone migration procedure 22B the access management procedure 22C can optimize the accessing procedure to make each write-in command capable of writing more data. Therefore, this can efficiently utilize each execution of sending a write-in command to raise the efficiency of data migration.

After migrating data in a zone, the storing procedure 22D can be utilized to store an initial address of the zone into an initial data. The initial data can represent the procedure of the data migration. In a preferred embodiment of the present invention, the initial data is copied and stored in each disk so that each disk stores a same initial data. After all the data of a zone is completely migrated, the initial data is updated to contain an initial address of the next zone. According to the updated initial data, the zone migration procedure 22B can start immediately to migrate data of the next zone. If the data migration program 20 is interrupted, because the initial data has been stored in each disk, the recovering procedure 22E can be utilized to read the initial data from each disk to determine which zone was being migrated during the interruption when the data migration program 20 is executed again. Furthermore, the recovering procedure 22E can utilize the zone migration procedure 22B to continuously perform the incomplete data migration.

Figure 2:
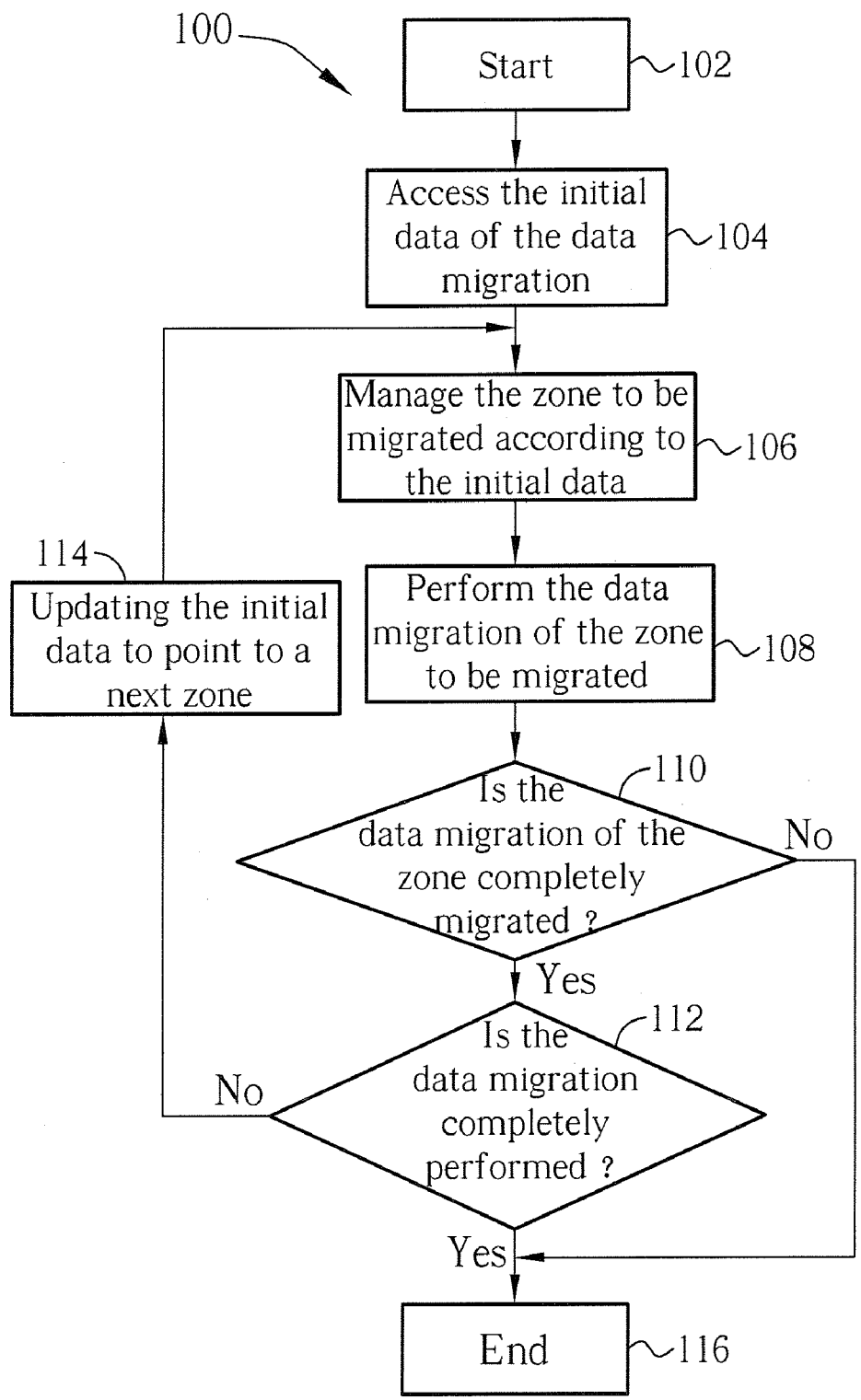
FIG. 2 is a flow chart of the computer system shown in FIG. 1 when executing the data migration program.

Please refer to FIG. 2 in conjunction with FIG. 1. FIG. 2 is a flow chart 100 of the computer system 10 executing the data migration program 20. The flow chart 100 comprises the following steps.

Step 102: Start to perform the data migration. When the user utilizes a disk array to replace a single disk, the user can make the computer system 10 perform the flow 100 to perform the data migration so that the data can be distributed to each disk from the original disk (i.e., the source disk). Furthermore, the flow 100 can be restarted after an interruption. For example, when the computer system 10 performs the flow 100, the user may temporarily interrupt the flow 100 for reasons such as needing executing other programs having higher priority. Interruption of the flow 100 because of a power failure is another example. After the flow 100 is interrupted, the user can still make the computer system 10 re-perform the flow 100 to continue the data migration.

Step 104: Access the initial data of the data migration. If the flow 100 is started without having performed any data migration, an initial data can be initialized in this step. The initial data stores an initial address to be migrated. In a preferred embodiment, the initial data is copied and stored in each disk of the disk array so that each disk stores the same initial data. On the other hand, if some of the flow 100 is performed but then interrupted, the initial data has been stored in each disk. Therefore, when the flow 100 is restarted, and this step is performed, this initial data can be read from the disk.

Step 106: Manage the zone to be migrated according to the initial data. As mentioned above, in each disk array structure, the data is divided into multiple fixed sizes such as: 4K, 8K, or 16K bytes of data stripes that are all stored separately in the disks. Therefore, when performing the data migration, the data of the source disk is divided into data stripes and each data stripe of the source disk is written into corresponding disks according to the disk array structure. It is during this step that the data migration is completely performed. After dividing the data to be migrated into multiple data stripes, the present invention further defines a plurality of data stripes, which are to be migrated to different disks but as a same zone. The present invention further defines all the data to be migrated as multiple zones and utilizes the zone as a unit to perform the data migration. In a preferred embodiment of the present invention, different zones can comprise a different number of data stripes. In this step, the zone to be migrated can be indicated by the initial data which points to the initial address. Furthermore, the number of the data stripes can be managed.

Step 108: Write the data stripes contained in the zone to be migrated into each disk of the disk array. That is, the data stripes in the zone to be migrated are firstly read from the source disk and then written/arranged to different disks. In the present invention's data migration procedure management, each zone comprises part of the data stripes to be written into the source disk and the other data stripes to be written into other disks. Therefore, these data stripes to be written into the source disk can be written into a zone before the zone to be migrated. In other words, the zone before the zone to be migrated can be a rewritable zone. Please note, when this step is performed, to raise the efficiency of reading/writing of the data, the present invention performs optimized access management to significantly raise the efficiency of each read/write-in command. As mentioned above, when a read/write-in command is sent to a disk, each command can only read/write a threshold (e.g., 128K bytes) of data. The system resources are consumed every time the read/write-in command is sent, therefore the read/write-in command should be efficiently utilized to read/write additional data. In the preferred embodiment of the present invention, the optimized access management is utilized to repeat a plurality of read commands to accumulate more data from the zone to be migrated, and to write the accumulated data into a certain disk until the accumulated data reaches a threshold data of the write command. Therefore, each read/write-in command can be very efficiently utilized so that the overall efficiency of the data migration can be improved.

Step 110: If the data stripes in the zone to be migrated are written into corresponding disks completely in step 108, the step 112 can be performed. If step 108 is interrupted so that not all the data stripes were written into corresponding disks then step 116 is immediately performed to ensure completion and finish flow 100. Please note, even when step 110 is interrupted, the initial address of the zone to be migrated has been stored in the initial data (see step 104). Therefore, if the flow 100 is performed again, the initial data can be utilized to identify the zone to be migrated and the data migration can be performed precisely again.

Step 112: Determine whether there is any data, which has not been migrated. If there is, step 114 is performed; otherwise, the step 116 is performed.

Step 114: After migrating the data stripes of the previous zone, the initial data of each disk can be updated to store the new initial address in the initial data of each disk, and step 106 is performed if there are data to be migrated in the source disk Therefore, the data migration of the next zone can be performed.

Step 116: The flow 100 is finished.

To further illustrate the data migration of the present invention, two disks of RAID0 are firstly utilized as an embodiment. The data migration of the two disks is illustration in the following disclosure. This disclosure demonstrates that the spirit of the technique can be broadened to include the data migration of N disks of RAID0 or the data migration of disks of other disk array structures.

Figure 3:
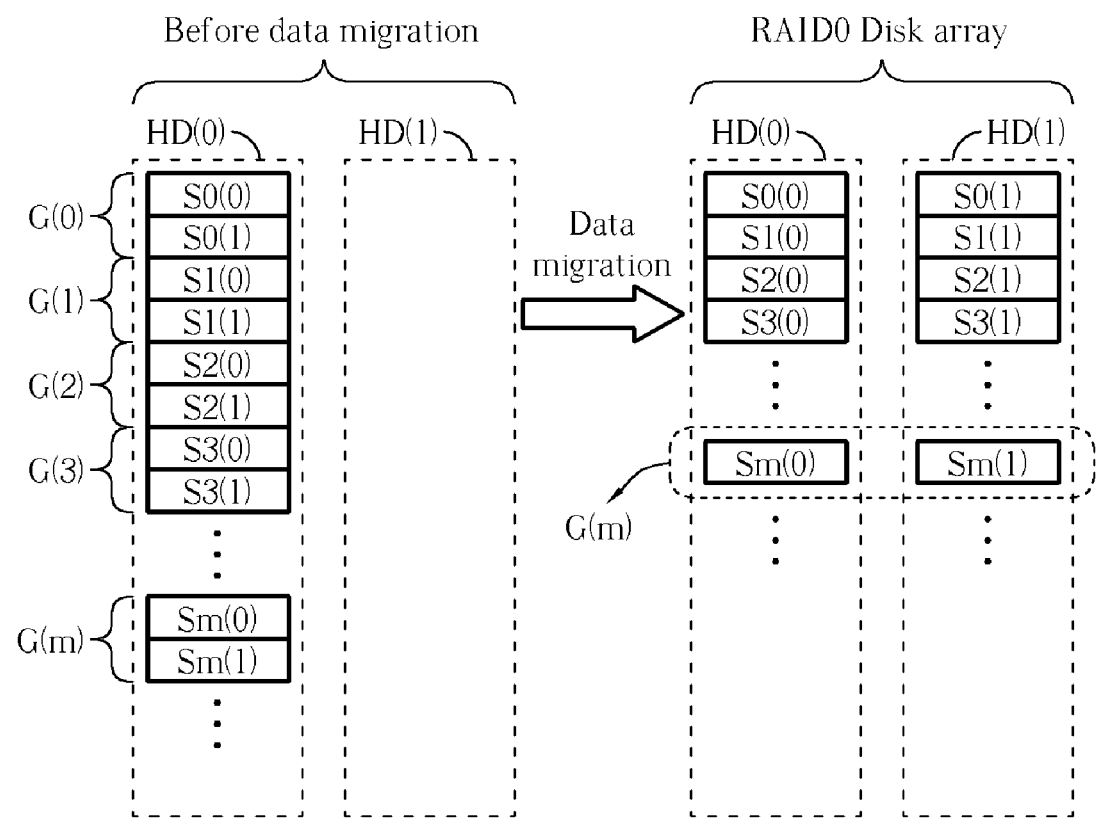
FIG. 3 is a diagram of data distribution of two disks according to a RAID0 disk array.

Please refer to FIG. 3 in conjunction with FIG. 1. Assume that the computer system 10 shown in FIG. 1 comprises two disks (N=2). FIG. 3 illustrates the data distribution of the two disks of RAID0. As shown in FIG. 3, before the data migration, the disk HD(0) is the source disk and the disk HD(1) has been added as a member disk. As mentioned above, in the RAID0, the data is distributed into each disk as data stripes. Therefore, data from the disk array is accessed in an equal manor from each data stripe from each disk. As shown in FIG. 3, before the data migration, the data in the source disk HD(0) can be divided into the data stripes S0(0), S0(1), S1(0), S1(1), S2(0), S2(1), to Sm(0), Sm(1). In addition, the purpose of the data migration is to distribute these data stripes into the disks HD(0) and HD(1). For example, the data stripes S0(0), S1(0), S2(0), . . . , which are already stored in the source disk, are migrated to other addresses of the source disk HD(0). Furthermore, the data stripes S0(1), S1(1), S2(1), . . . , must to be migrated to the member disk HD(1). To illustrate, the data stripes, which are to be migrated into the same disk, are defined as the same group. As shown in FIG. 3, after the data migration, the data stripes S0(0) and S0(1) are respectively stored as a first data stripe in the disks HD(0) and HD(1). In addition, the data stripes S0(0) and S0(1) are stored in the same layer of the data array so that the two data stripes S0(0) and S0(1) can be accessed at the same time. Therefore, they can be defined as the same group G(0). Similarly, the data stripes S3(0) and S3(1) can be defined as the same group G(3) and the data stripes Sm(0) and Sm(1) can be defined as the same group G(m).

Figure 4:
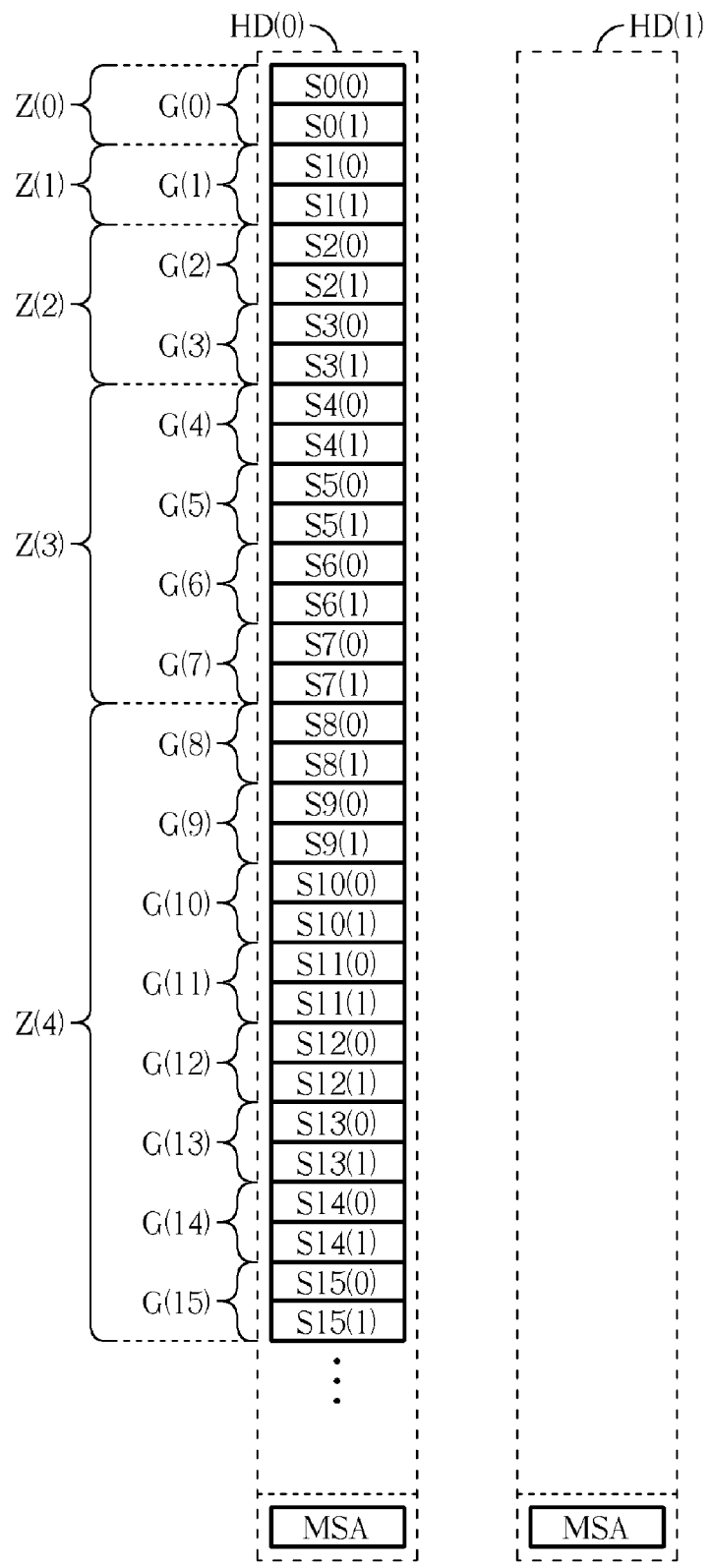

Please refer to FIG. 4 and FIG. 5. FIG. 4 is a diagram showing the management of different zones in the migration procedure management according to the present invention. FIG. 5 illustrates the number of groups and data stripes of each zone shown in FIG. 4. As shown in FIG. 4, in a preferred embodiment, the first zone Z(0) to be migrated can comprise a group G(0) and the second zone Z(1) can also comprise a group. The size of each zone can be increased in index degrees. For example, the zone Z(2) can comprise two groups, the zone Z(3) can comprise four groups, the next zone Z(4) can comprise eight groups, and so on. Similarly, the zone Z(j) can comprise $2^{(j-1)}$ groups, where each data stripe comprises two data stripes (the amount of the data stripes is 2j).

Figure 6:
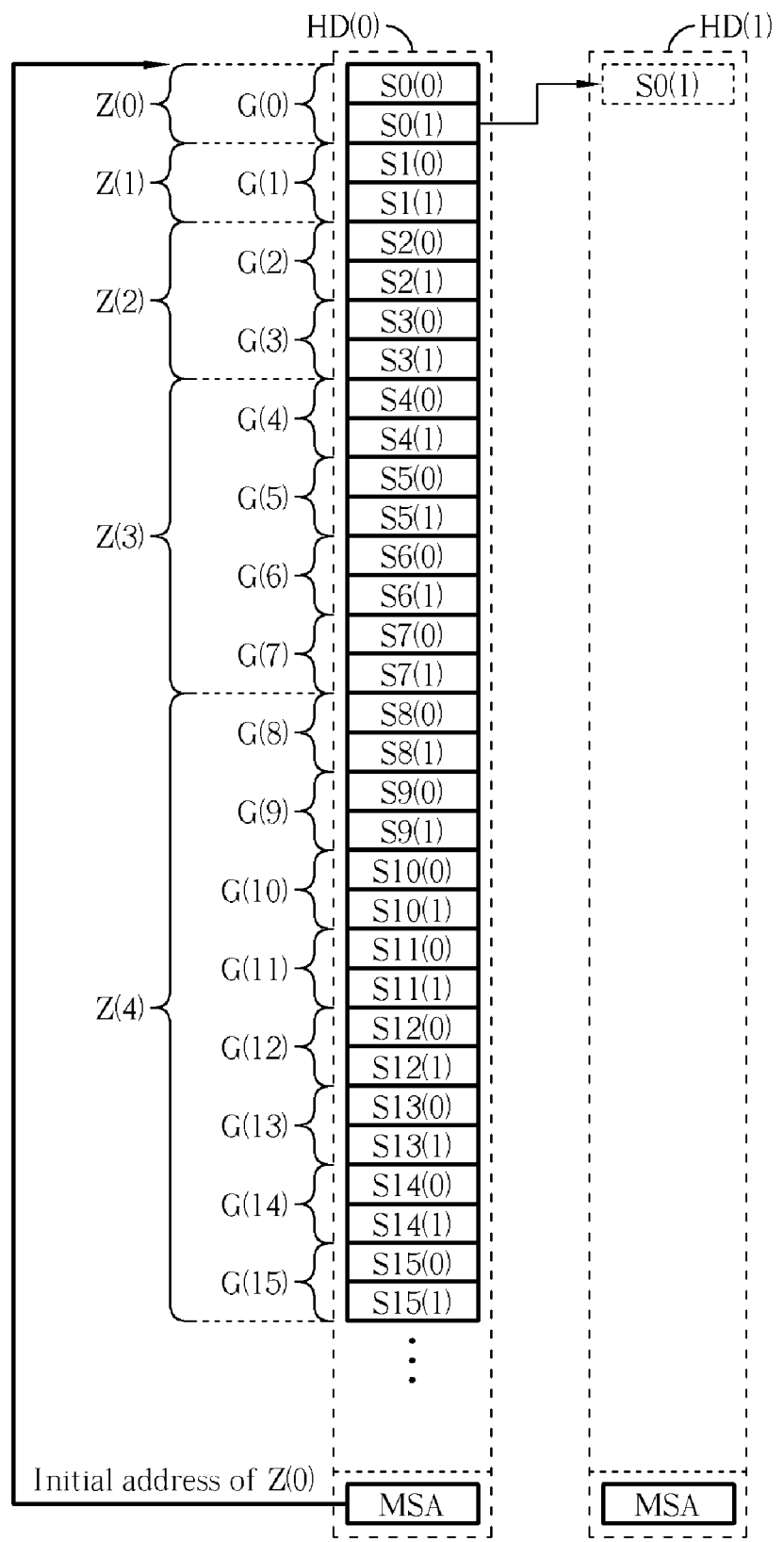
FIG. 6 to FIG. 10 illustrate the data migration of the disk array shown in FIG. 3 according to the present invention.
Figure 7:
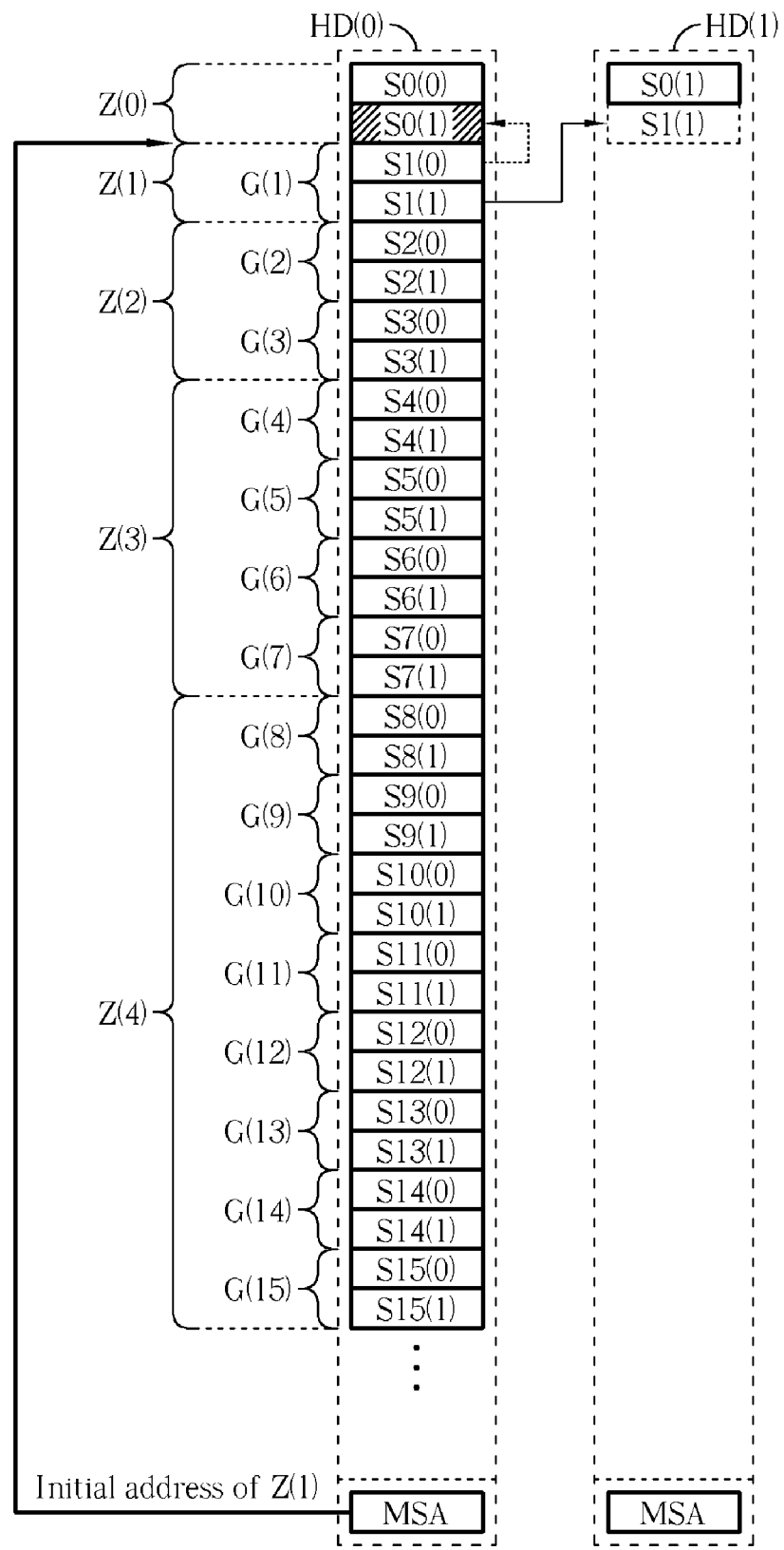

Please refer to FIG. 6 through FIG. 10 in conjunction with FIG. 2. When the flow 100 is performed, FIG. 6 through FIG. 10 are respectively utilized to show different steps of the flow 100. As shown in FIG. 6, when the flow 100 shown in FIG. 2 is started, each disk HD(0) and HD(1) stores an initial data MSA (step 104) which points to an initial address of the data to be migrated. At this point, no data has been migrated and the initial address stored in the initial data MSA is the initial address of the first zone of the source disk HD(0). That is, the initial address at this time is the initial address of all data to be migrated. Until step 108 is performed, the data stripe S0(1), which is stored in the zone Z(0) and to be migrated into the member disk HD(1), is read from the source disk HD(0) and then is written into the member disk HD(1). This operation is equal to copying the data stripe S0(1) from the disk HD(1) to the disk HD(0). As shown in FIG. 3, after the data migration, the address of the data stripe S0(0) remains unchanged. Therefore, in FIG. 6, there is no need to migrate the data stripe S0(0).

If the data stripe S0(1) is smoothly copied to the disk HD(1) then the data migration of zone Z(0) is completed. The flow 100 can now proceed to step 114 after step 110 and step 112. As shown FIG. 7, when step 114 is performed, the initial data MSA of each disk is updated as the initial address of the zone Z(1). This represents zone Z(1) is regarded as a new zone to be migrated. The previous zone Z(0) is now considered a rewritable zone. When step 108 is performed again, the storage location of data stripe S0(1) can now be utilized to store S1(0) of the zone Z(1) because the data stripe S0(1) in the zone Z(0) has already been copied to the disk HD(1). Therefore, when the zone Z(1) is migrated, the data stripe S1(0) is read from the zone Z(1) and the data stripe S0(1) in the zone Z(0) is overwritten by the data stripe S1(0). As a result, the data stripe S1(0) is copied/written to the zone Z(0). At the same time, the data stripe S1(1) is read and written to the disk HD(1). In other words, the data stripe S1(1) is copied to the disk HD(1). Please note, that in addition to the above-mentioned data migration of data stripe in zone Z(1) the initial data MSA is not changed or updated.

Figure 8:
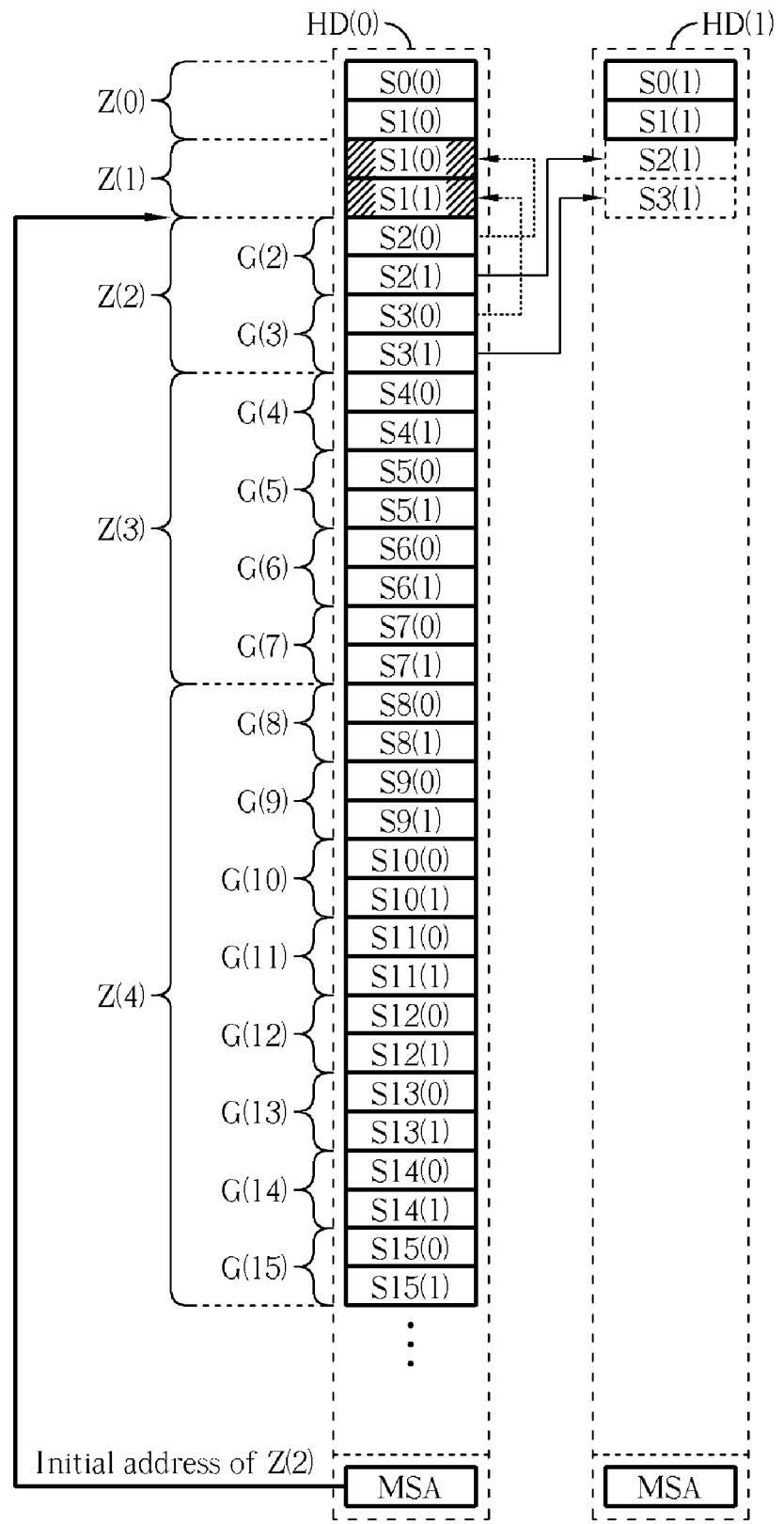

After copying the data stripes S1(0) and S1(1) in zone Z(1) to corresponding disks, step 114 of the flow 100 is performed again. As shown in FIG. 8, when the step 114 is performed again, the initial data MSA of each disk HD(0) and HD(1) is once again updated. At this time, the initial data MSA points to an initial address of the next zone Z(2). In other words, the zone Z(2) becomes a zone to be migrated and the zone Z(1) becomes a rewritable zone. Because the data stripes S1(0) and S1(1) of the zone Z(1) are copied to corresponding disks, the data stripes S2(0) and S3(0), which are to be migrated to the source disk, can be written in the zone Z(1), and the other two data stripes S2(1) and S3(1) are copied to the disk HD(1). Please note, because the zone Z(1) comprises two rewritable data stripes, the zone Z(2) can comprise two groups because only a single data stripe is written to the zone Z(1) per group. The other data stripe is written into the member disk. Therefore, the two rewritable data stripes of the zone Z(1) can correspond to the two groups of zone Z(2). As a result, the size of the zone Z(2) can be twice the size of the zone Z(1).

Figure 9:
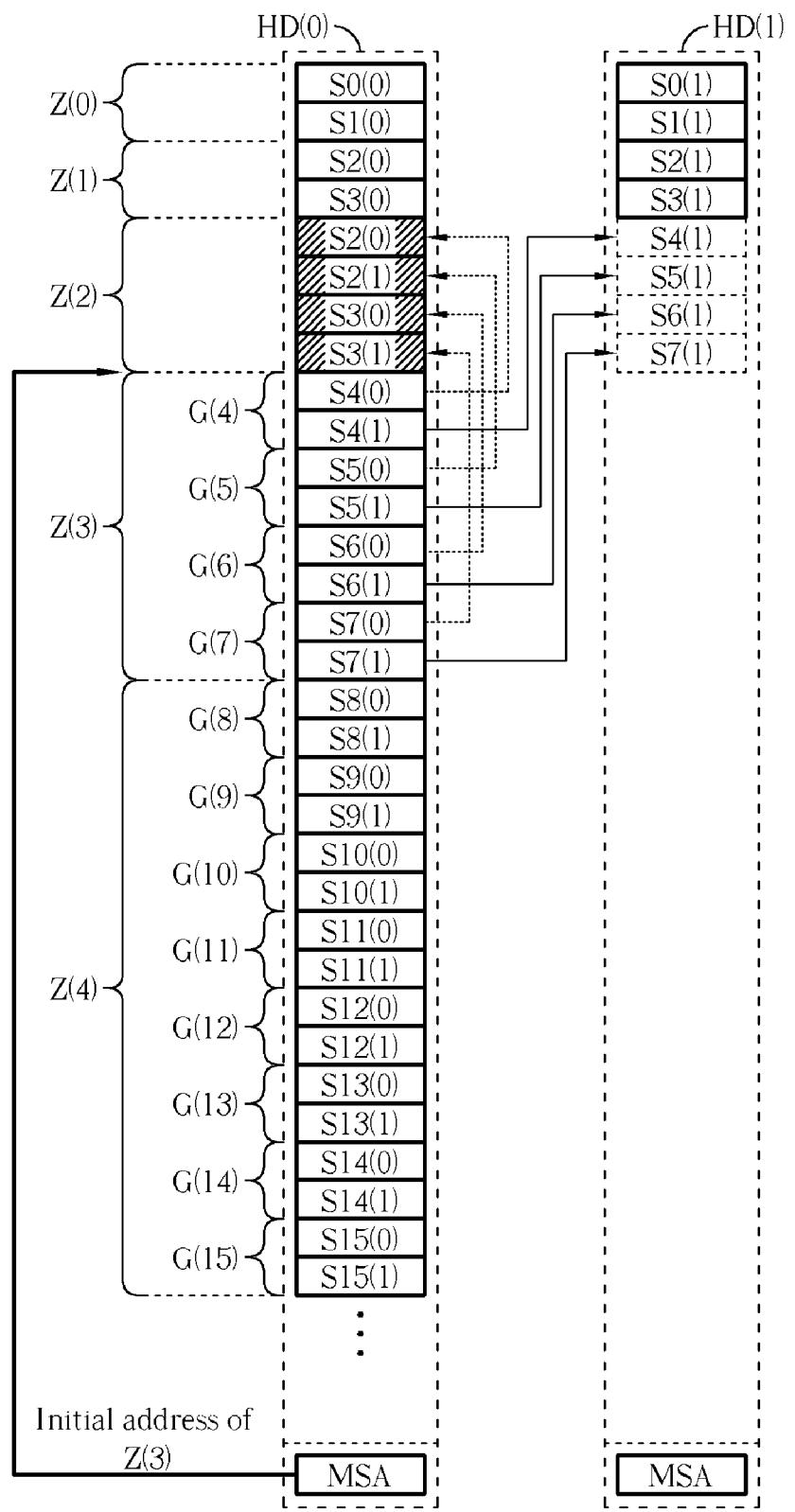

After smoothly migrating the four data stripes of the zone Z(2) to corresponding disks (step 108), the step 114 is performed again to migrate each data stripe of a next zone Z(3). As shown in FIG. 9, the initial data MSA is updated as the initial address of the zone Z(3). The four data stripes of the zone Z(2) become rewritable data stripes. The four data stripes of the zone Z(3) correspond to the data stripes S4(0), S5(0), S6(0), and S7(0) of the zone Z(3). The other four data stripes S4(1), S5(1), S6(1), and S7(1) are copied to the disk HD(1). Similarly, because the zone Z(2) comprises four rewritable data stripes, the zone Z(3) can comprise four groups. Therefore, the size of the zone Z(3) can be twice the size of the zone Z(2). As mentioned above, the next zone can comprise as many groups as the data stripes of the previous zone. In other words, the present invention allows the zone to be increased in an index degree as shown in FIG. 5.

Figure 10:
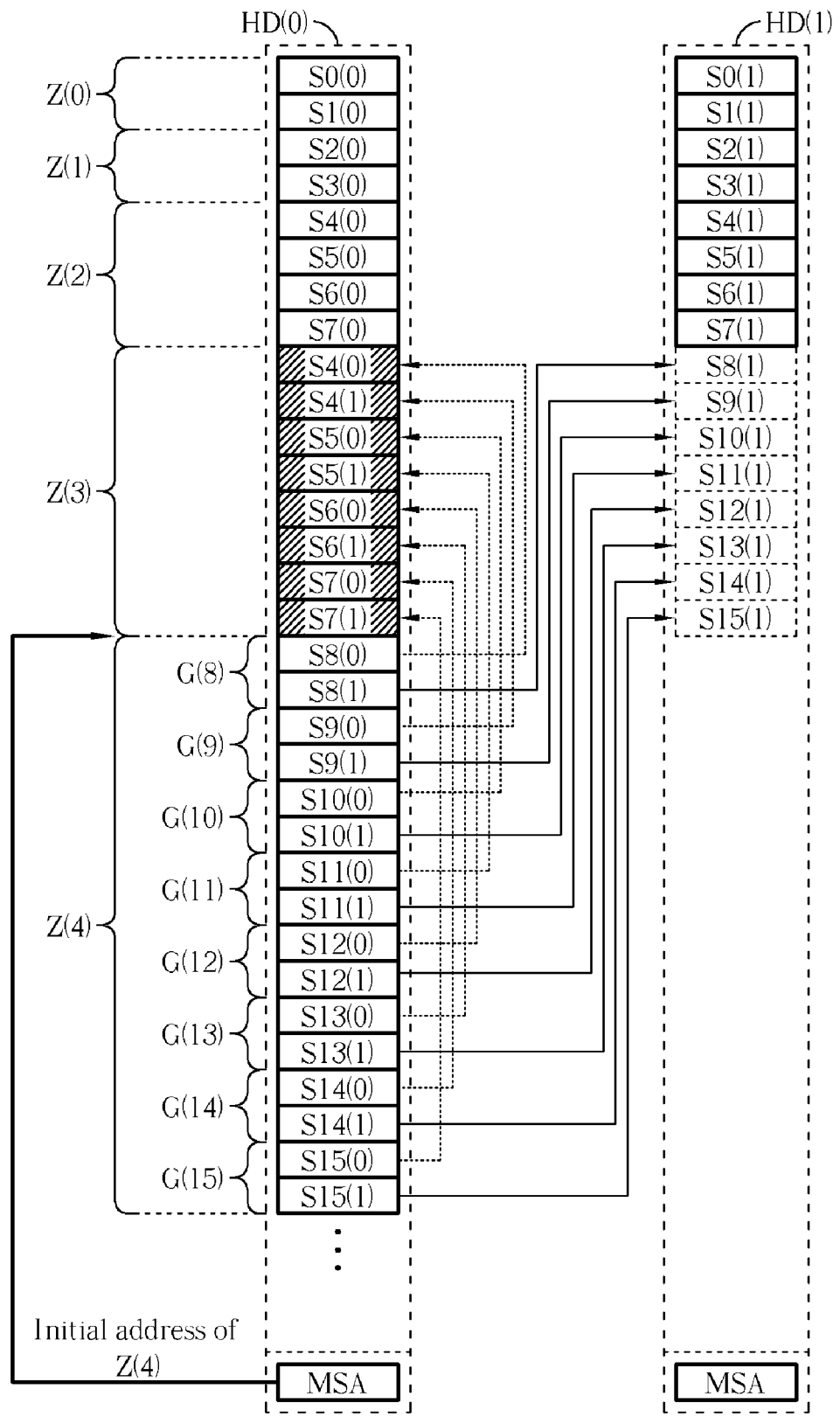

After respectively copying each data stripe of zone Z(3) to corresponding disks, as shown in FIG. 10, the initial data stored in each disk is updated again to point to the initial address of the zone Z(4) to migrate 16 data stripes of zone Z(4). Eight data stripes of the 16 data stripes are copied to the previous zone Z(3) and the other eight data stripes are copied to the member disk HD(1). According to the above-mentioned data migration, the entire data migration can be completely performed. As shown in FIG. 10, data stripes S0(0) to S7(0) and S0(1) to S7(1) are all distributed to the two disks completely according to the disk array structure.

Figure 11:
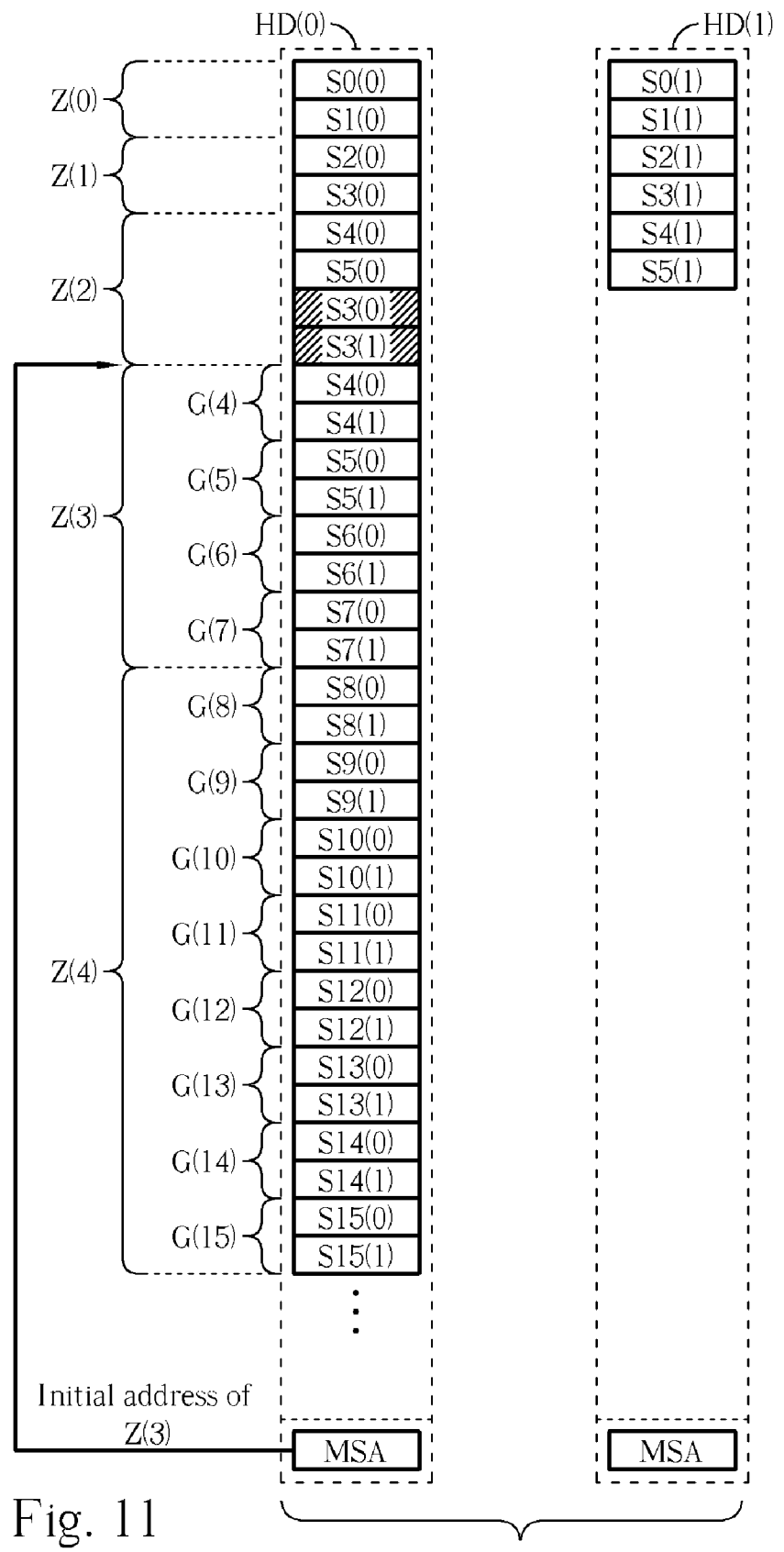
FIG. 11 and FIG. 12 illustrate the operation of recovering the data migration of the disk array shown in FIG. 3 according to the present invention.
Figure 12:
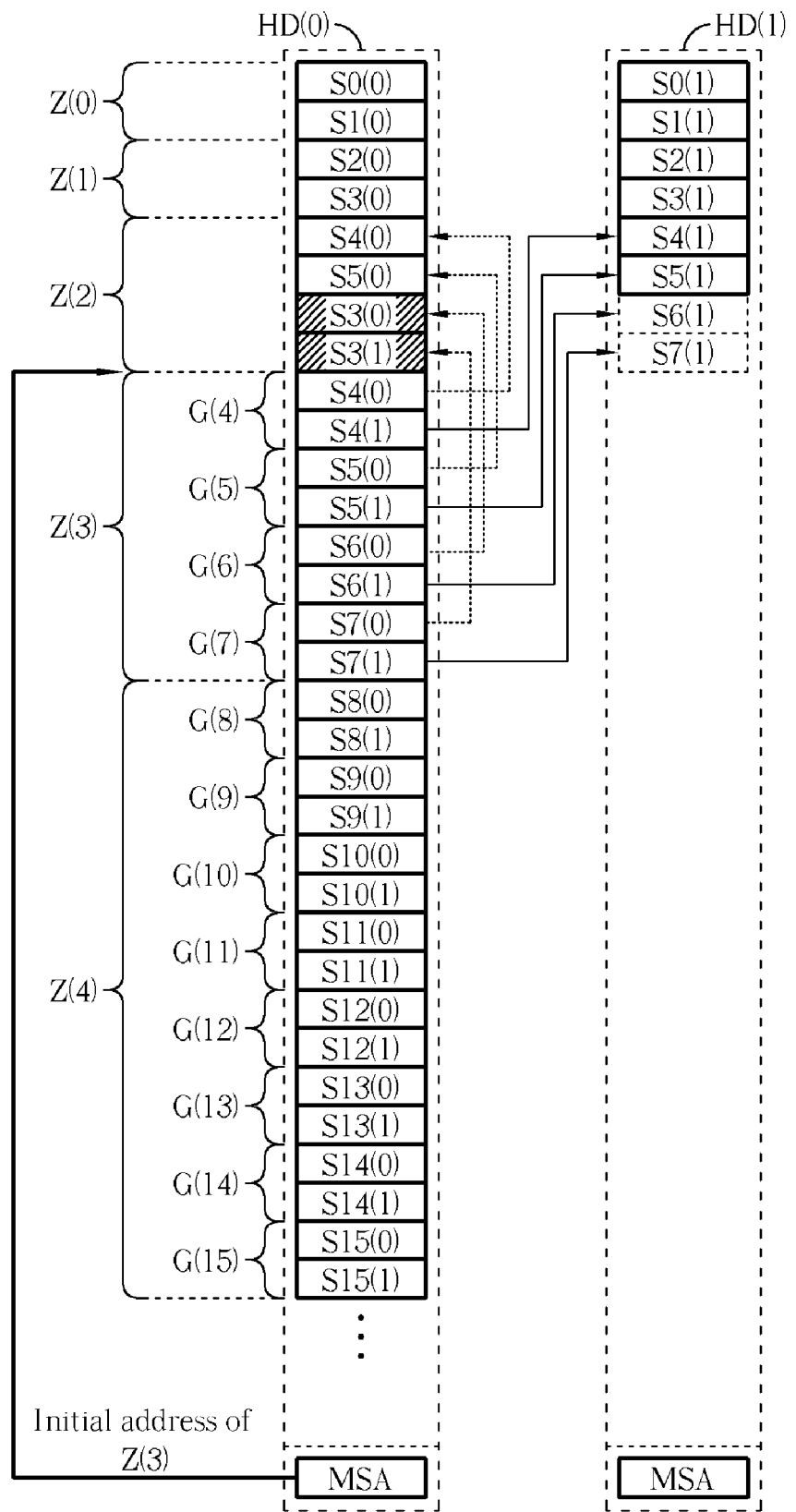

In addition, the operation of maintaining the safety of the data migration can be illustrated as follows. The embodiment in FIG. 3 is utilized to illustrate the safety operation. Please refer to FIG. 9, FIG. 11, and FIG. 12. Assuming that the flow 100 is interrupted when the step shown in FIG. 9 is performed and the distribution of each data stripe is shown in FIG. 11. As shown in FIG. 11, the data stripes S4(0), S5(0), S4(1), and S5(1) are migrated to corresponding places correctly, but the groups G(6) and G(7) of the zone Z(3) have not yet been migrated. Because the flow 100 is interrupted when the zone Z(3) is migrated the initial address stored in each disk continues to point to the initial address of the zone Z(3). As shown in FIG. 11, although the data migration is interrupted when the zone Z(3) is migrated, all data stripes of the zone Z(3) are not overwritten. The data stripes of the zone Z(2) might be overwritten or destroyed as a result of the interruption. Fortunately, all data stripes have been copied to corresponding disks before the interruption. Regardless of the conditions of the data stripes of the zone Z(2), the data migration can recover so long as the data stripes of the zone Z(3) are not overwritten. Please note, when the flow 100 is recovered, the operation is shown in FIG. 12. It can be detected that the data migration was interrupted in the zone Z(3) (step 104 shown in FIG. 2) according to the initial data MSA stored in the disk. Therefore, the flow 100 is recovered to start to migrate all the data stripes in the zone Z(3) from the initial address of the zone Z(3). The data stripes S4(0), S5(0), S6(0), and S7(0) are rewritten into the zone Z(2) regardless of whether these data stripes were written into the zone Z(2) before the interruption. Similarly, S4(1), S5(1), S6(1), and S7(1) are immediately rewritten into the disk HD(1) regardless of whether these data stripes were written into the disk HD(1) before the interruption. Therefore, the data migration can be recovered from the zone Z(3) without losing or breaking any data.

Considering the examples shown in FIG. 11 and FIG. 12, when the initial data points to a certain zone Z(J), the present invention copies the data of the zone Z(j) to a previous zone Z(j−1) without overwriting the data stripes in the zone Z(j). Therefore, an interrupt of the data migration only influences the data stripes of the zone Z(j−1). Furthermore, from the flow 100, when the initial data points to the zone Z(j) instead of the zone Z(j−1), this indicates that the data stripes of zone Z(j−1) have all smoothly copied to a corresponding disk. Therefore, the zone Z(j−1) can be utilized and the original data stripes in the zone Z(j−1) are not lost or broken because the original data stripes are all stored in other zone. The present invention ensures the data safety when the data migration is performed. Please note, the present invention can easily utilize zones of different sizes while ensuring the safety of the data. In fact, because the present invention must update the initial data MSA of each disk after migrating data stripes of the zones, the increased index degree sizes of the zones can reduce the times needed for updating the initial data MSA. The increased index degree in effect increases the efficiency of the data migration. In addition, besides storing the progress of the data migration, the information of the initial data MSA can help the computer system to realize the distribution of the disk array. For example, the basic input/output system BIOS of the computer system can determine the condition (e.g. how to load the operating system program from the disk array) of the disk array from the initial data MSA.

The present invention can set an appropriate threshold value of the size of each zone considering the needed recovery time after the interrupt. As mentioned above in FIG. 11 and FIG. 12, when the data migration of a certain zone is interrupted, the present invention can migrate all the data stripes of the certain zone again when the data migration is recovered. If the size of the certain zone is too large then the zone may need a lot of time to be migrated again. To avoid the above-mentioned problem, a threshold value (e.g. 1% of the size of the source disk) of each zone can be set. The threshold value can be adjusted according to different design demands. For example, if the possibility of the interrupts is low or the user unconcerned about longer recovery time then the threshold value can be set to a longer time (e.g. 5% of the size of the source disk).

Figure 13:
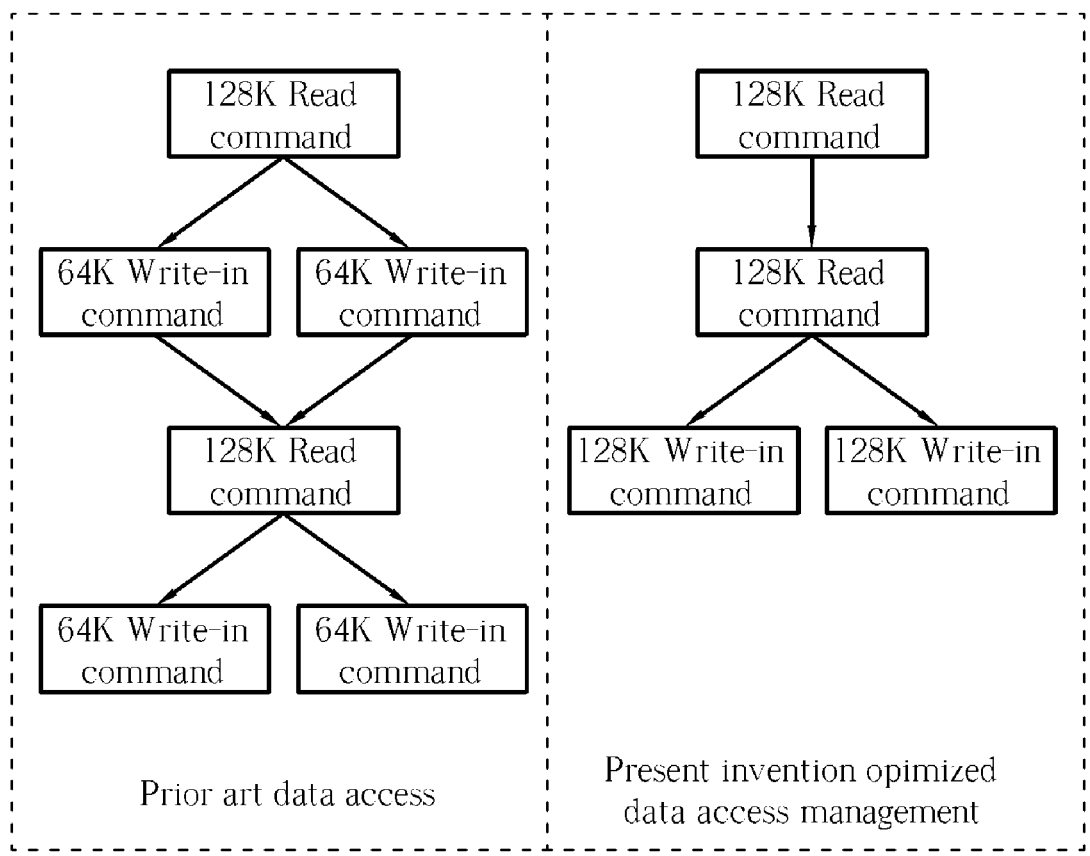
FIG. 13 illustrates the optimized access management in the data migration of the disk array shown in FIG. 3 according to the present invention.

The following example is shown in FIG. 3. Please refer to FIG. 13. FIG. 13 illustrates the optimized data access in the data migration. From FIG. 6 to FIG. 10, it is apparent that as zones are migrated the operation of reading data stripes to be migrated from the source disk and writing the read data stripes into corresponding disks requires performing a significant amount of accessing operations. To increase the efficiency of these accessing operations the present invention performs an optimized access management. As mentioned above, when a read/write-in command is sent to a disk, the size of the data to be read/written is limited. For example, the size of the data may be limited to 128 bytes. Each read/write-in command should be efficiently utilized to read/write-in more data because these commands utilize significant system time. In the left side of FIG. 13, a prior art non-optimized data access procedure is shown. If a 256K-byte data must be migrated in a RAID0 disk array having two disks, in the prior art, a read command is firstly sent to the source disk to read a 128K-byte data. Next, the 128K bytes are divided into two 64K-byte parts according to the RAID0 disk array structure. Finally, two write-in commands are sent to write the two 64K-byte parts of data to two disks at the same time. The above-mentioned 128K-byte read command and two 64K-byte write-in commands are repeatedly utilized so that a 256K-byte data can be migrated completely.

As mentioned above, the prior art does not sufficiently utilize the write-in command. That is, one write-in command can be utilized to write at most 128K-byte data, but the prior art write-in command can only be utilized to write 64K-byte data. To efficiently utilize each write-in command, the present invention utilizes an optimized data access procedure shown in the right side of FIG. 13. As shown in FIG. 13, two read command are sequentially repeated to read the 256K-byte data. Then, the 256K-byte data are divided into two 128K-byte parts of data according to the disk array structure. Furthermore, the two 128K-byte parts of data are migrated to corresponding disks so that the 256K-byte data migration is completely performed. The prior art must send six read/write-in commands in 4 different times to migrate the 256K-byte data. The present invention, utilizing an optimized data access procedure, only sends four read/write-in commands in 3 times. Therefore, the present invention can further increase the accessing efficiency of the data migration and shorten the needed time of the data migration.

As mentioned above, the present invention performs the data migration in a unit of "zone". In other words, when the present invention reads each data stripe of a certain zone, the present invention cannot utilize one read command to read data stripes of different zones. That is, data stripes of different zones must be read by different read command from the source disk. If one read command could be utilized to read data stripes of different zones then in the event of an interruption during the data migration it would be known which zone was being migrated at the time of the interruption. The zone of set to the small when the flow 100 of the present invention is initially performed. For example, the zones Z(0), Z(1) comprise only two data stripes (this is shown in FIG. 5), where each data stripe is normally 4K, 8K, or 16K bytes. Therefore, only one read command can be utilized to read all the data stripes. However, if the size of the zone is increased, the advantage of the present invention's optimized data access management becomes especially obvious. For example, if each data stripe is 16K bytes then the zone Z(5) comprises 16 data stripes and the zone Z(5) comprises 256K-byte data. Therefore, the optimized data access management shown in FIG. 13 can be utilized to accelerate the data migration. In addition, because the size of the zone after the zone Z(5) is increasing, the advantage of the optimized data access management becomes more valuable.

Figure 14:
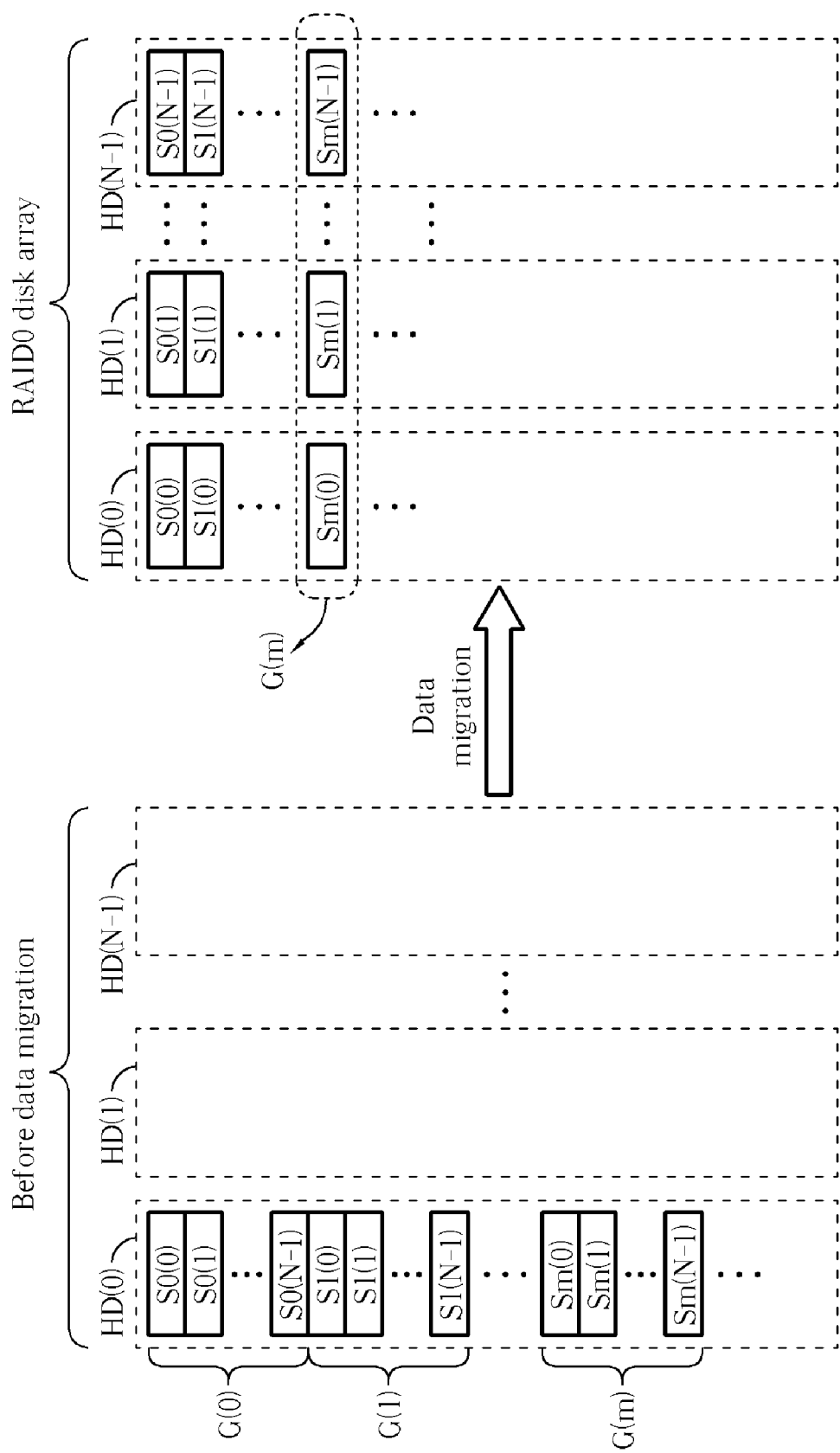
FIG. 14 is a diagram of data distributions of N disks of RAID0 disk array according to the present invention.

In FIG. 3 through FIG. 13, the RAID disk array having two disks is utilized as an example to illustrate the present invention techniques. In the following illustration, the present invention is broadened. Now the present invention is utilized to perform the data migration in a RAID disk array having N disks. Please refer to FIG. 14, which illustrate the data migration of the RAID disk array having N disks. The data are stored in the source disk HD(0) before the data migration. After member disks HD(1) to HD(N−1) are added to form a disk array, the data in the source disk are divided into multiple data stripes and distributed to each disk. As shown in FIG. 14, the data stripes S0(0) to S0(N−1), inside the source disk HD(0), are distributed to the disk HD(0) to HD(N−1) after the data migration. These data stripes, which can be accessed simultaneously, can be regarded as being in the same layer. Furthermore, these N data stripes can be defined as the same group G(0). Similarly, the data stripes Sm(0) to Sm(N−1) can be also be regarded as being in the same layer and can be accessed simultaneously. The data stripes Sm(0) to Sm(N−1) can be defined as the same group G(m).

Figure 15:
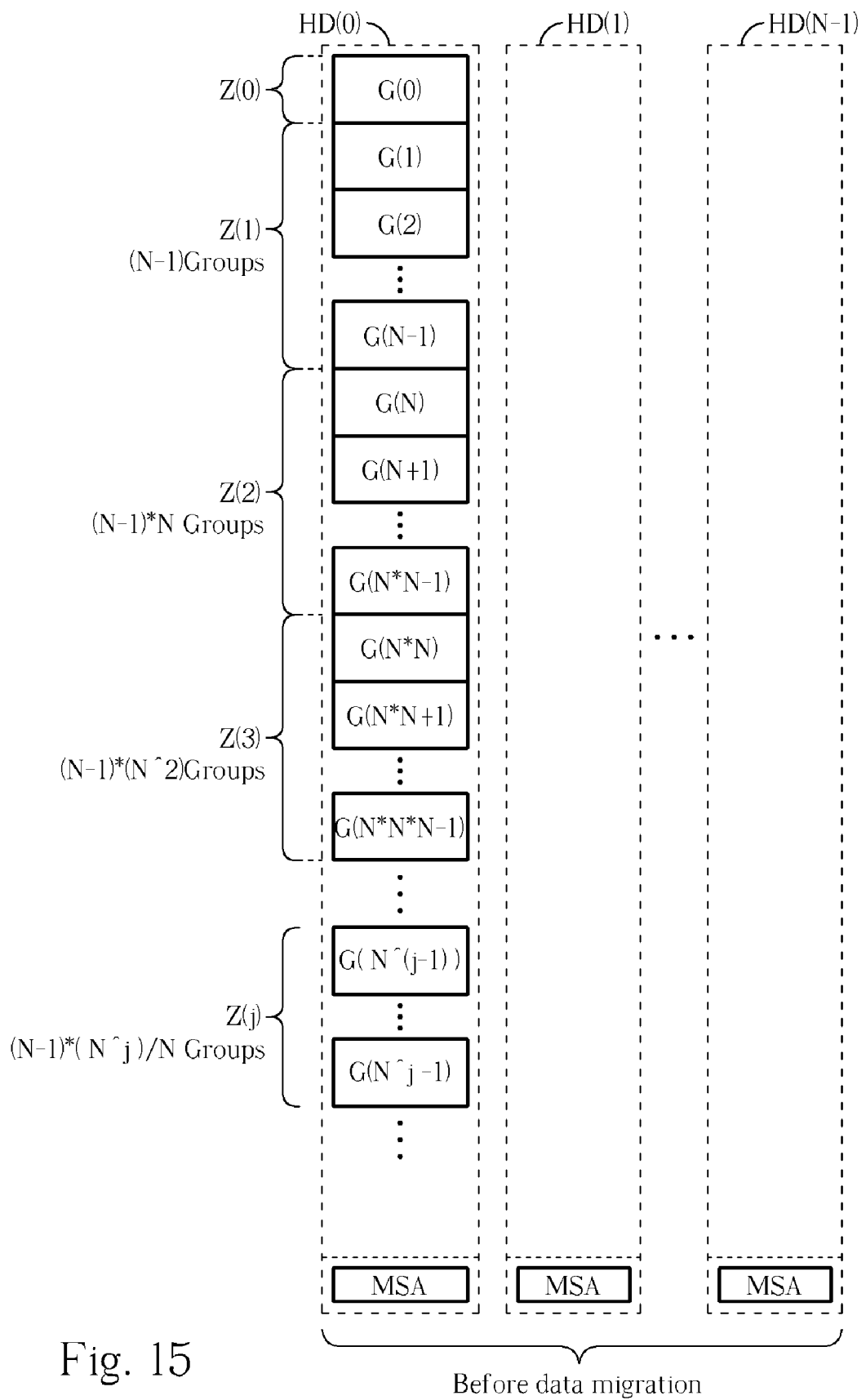

Following the example of FIG. 14, please refer to FIG. 15 and FIG. 16. FIG. 15 illustrates the zone management according to the present invention. FIG. 16 illustrates the size of each zone according to the present invention. FIG. 16 illustrates the number of the groups and the number of the data stripes in each zone, for example, FIG. 16 shows one embodiment where the number of data stripes in zone Z(0) equals N and the number of data stripes in zone Z(1) equals $(N-1)*(N^j)$ for j>0. FIG. 15 and FIG. 16 show the size of the zone can be increased in an index degree in the case of N disks. The zone Z(0) comprises one data stripe (the data stripe S0(0)), which does not have to be migrated. Therefore, the zone Z(0) comprises (N−1) data stripes which can be overwritten after the data migration. In addition, the zone Z(1) can comprises (N−1) groups because each group comprises only a single data stripe written into the zone Z(0). The other data stripes are written into other member disks. Therefore, the other (N−1) data stripes in the zone Z(0) can correspond to the (N−1) groups of the zone Z(1). According to the same theory, if a previous zone Z(j) comprises M data stripes, which can be overwritten, then the next zone Z(j+1) can comprises M*N groups (M*N*N data stripes). As mentioned above, the size of the zones can be increased in an index degree. As shown in FIG. 16 and as mentioned above, considering the needed recovery time after an interrupt of the data migration, the present invention can set a threshold value of the size of the zone. For example, the present invention can set the threshold value as 1% of the size of the source disk. In other words, the size of the zone Z(j) is min {the amount size of the (N−1)*(N^j) data stripes, the threshold}. This means that the present invention can choose a smaller threshold value and a smaller amount size of the (N−1)*(N^j) data stripes to calculate the size of the zone Z(j).

Figure 17:
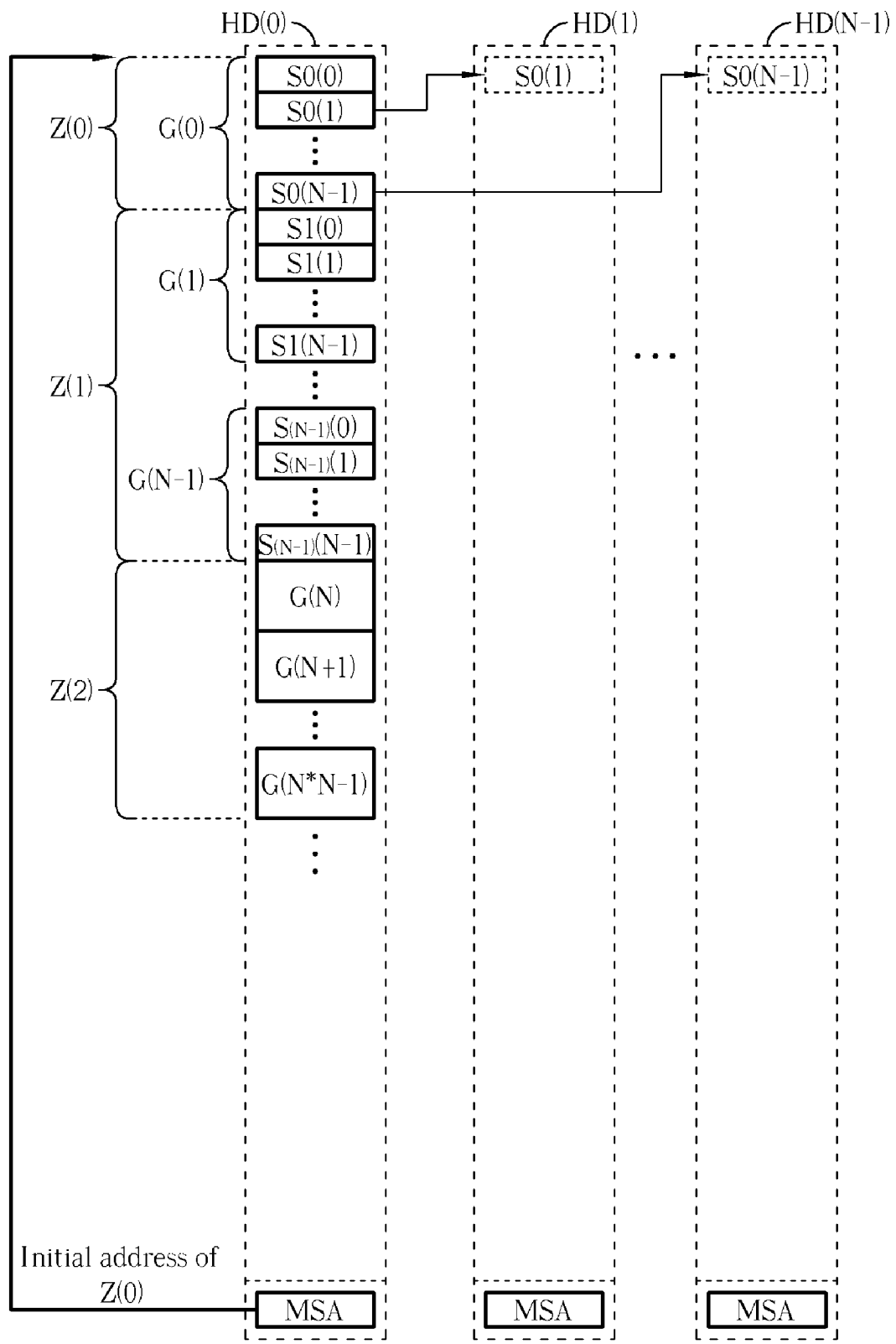
FIG. 17 to FIG. 19 are diagrams illustrating the data migration of the disk array shown in FIG. 14 according to the present invention.
Figure 18:
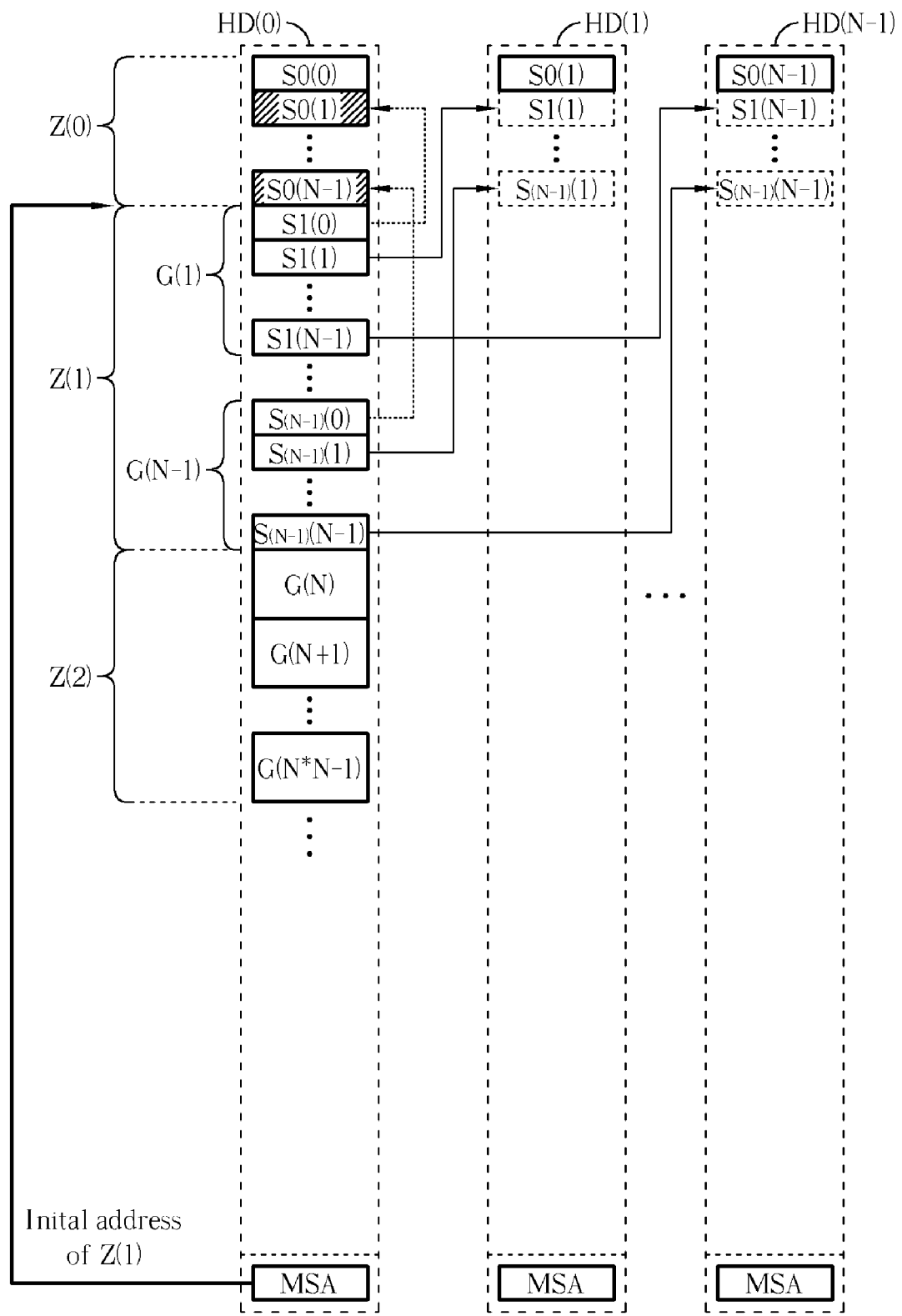

Please refer to FIG. 17 through FIG. 20. Similar to the example shown in FIG. 14 and FIG. 15, FIG. 17 through FIG. 19 illustrate the procedure (the flow 100 shown in FIG. 2) of the data migration of the disk array having N disks. Firstly, as shown in FIG. 17, the data migration is started. When the data migration is started, each initial data MSA points in each disk points to the initial address of the zone Z(0), and each data stripe S0(1) to S0(N−1) starts to be copied (written) to the disks HD(1) to HD(N−1). Please note that the data stripe S0(0) does not have to be migrated. Secondly, as shown in FIG. 18, after smoothly copying the data stripes S0(1) to S0(N−1) into the member disks, the initial data MSA is updated to point to the next zone Z(1). Therefore, the zone Z(1) starts to be migrated, and the previous zone Z(0) can be a zone capable of being overwritten. This means that the data stripes S0(1) to S0(N−1) in the zone Z(0) can be overwritten by the first data stripes S1(0), S2(0), . . . , $S_{(N-1)}$(0) of the (N−1) groups of the zone Z(1). At the same time, the data stripes S1(1), S2(2), . . . , $S_{(N-1)}$(0) are copied to the disk HD(1). Therefore, it can be easily seen that the data stripes S1 (N−1), S2(N−1, $S_{(N-1)}$(N−1) are copied to the disk HD(N−1).

Figure 19:
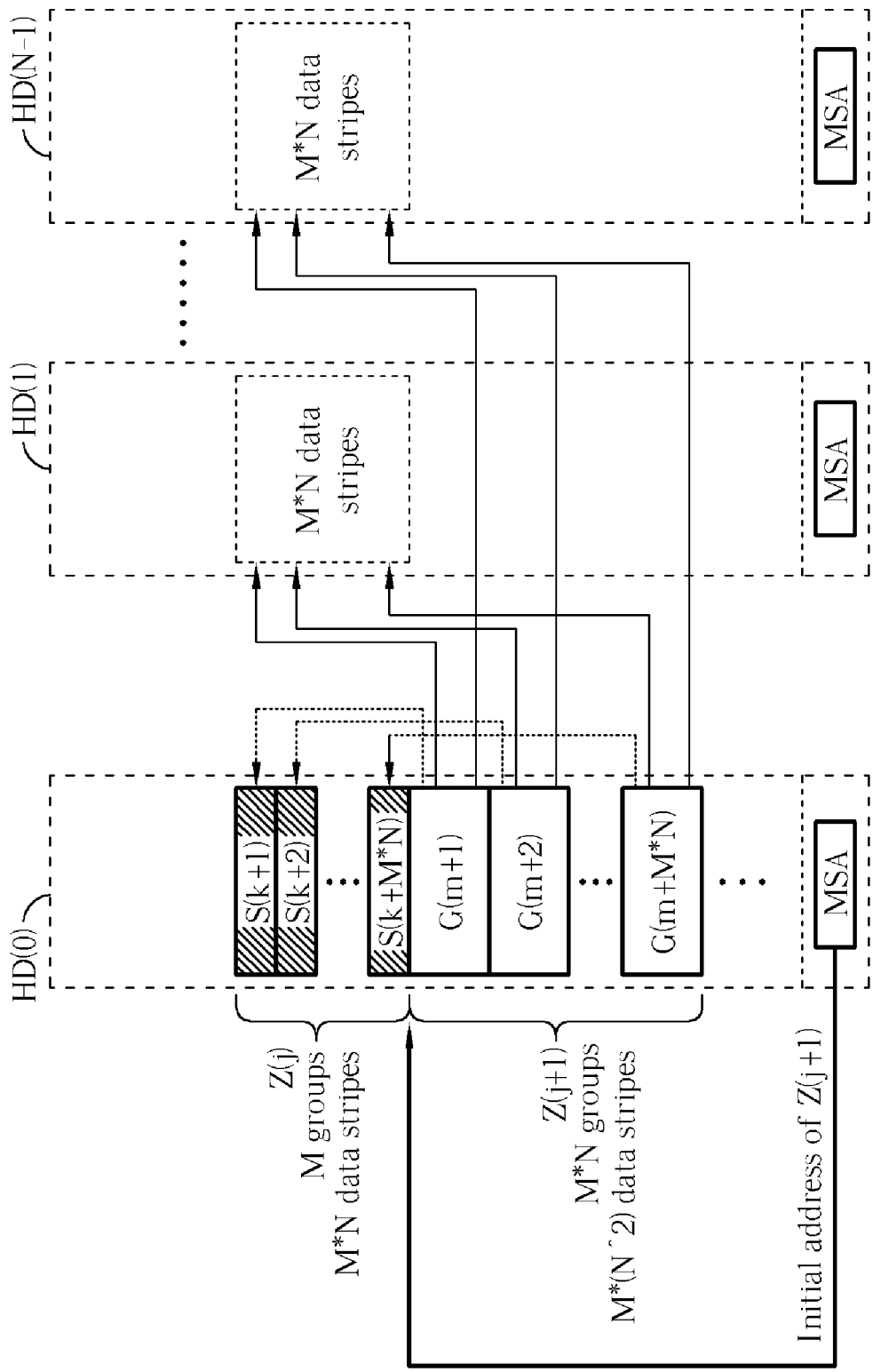

After all data stripes of the (N−1) groups in the zone Z(1) are copied to corresponding disks, the N*(N−1) data stripes in the zone Z(1) become data stripes capable of being overwritten. Following the condition shown in FIG. 18, a more general data migration can be illustrated as shown in FIG. 19. Assuming that the zone Z(j) comprises M groups and M*N data stripes, the Z(j+1) can comprise M*N groups (that is, the groups G(m+1) to G(m+M*N)) and M*($N^2$) data stripes). When the data migration is performed at the zone Z(j+1) the initial data MSA points to the zone Z(j+1) and stores the initial address of the zone Z(j+1). Furthermore, the data migration is to copy/write the first data stripes (M*N data stripes) of the group G(m+1) to G(m+M*N) into the zone Z(j). At the same time, the second data stripes (M*N data stripes) of the group G(m+1) to G(m+M*N) are copied/written to the disk HD(1). The $N^{th}$ data stripes (M*N data stripes) of the group G(m+1) to G(m+M*N) are copied/written to the disk HD(N−1) and so on. Therefore, the data migration can be performed completely according to the method shown in FIG. 19.

Figure 20:
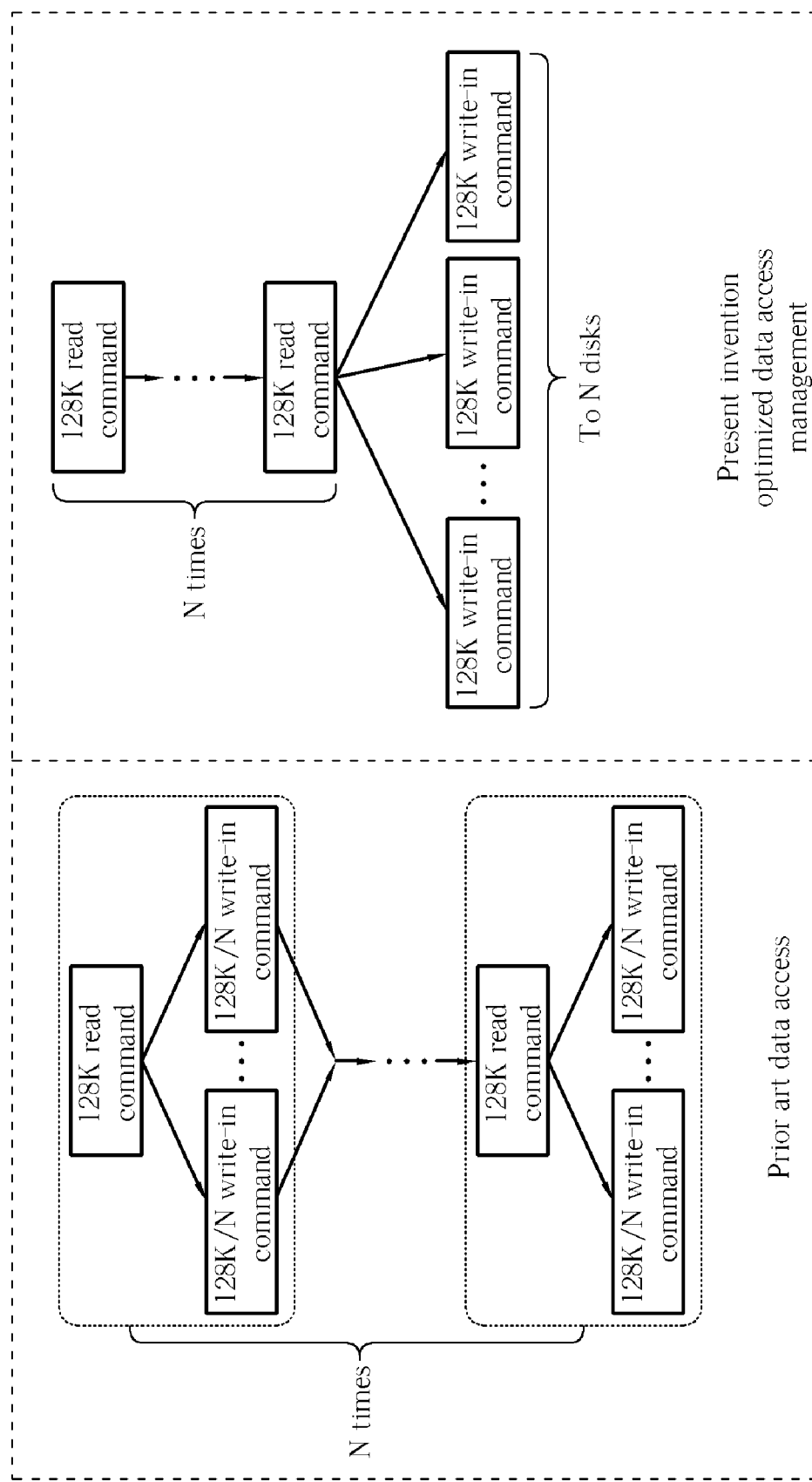
FIG. 20 is a diagram illustrating the optimized access procedure management in the data migration of the disk array shown in FIG. 14 according to the present invention.

Following the example shown in FIG. 14, the present invention optimized data access management utilizing in the disk array having N disks is shown in FIG. 20. In the prior art access procedure, after one read command is sent to the source disk, and then the read data is written into each disk. Therefore, each write-in command can be only utilized to write fewer data. If N*128K byte data migration must be performed, the prior art must send N*(N+1) read/write-in commands in 2*N times. In contrast to the prior art, the present invention can repeatedly send a plurality of read commands to the source disk. After more data are read, the data can be written into corresponding disks utilizing a single command once. Therefore, in the present invention, in order to complete an N*128K data migration, the present invention has only to send 2*N read/write-in commands in (N+1) times. By efficiently utilizing the write-in commands, the present invention can save time and system resources in the data migration. The present invention is not limited to send the write-in command after N read commands. It can be adjusted according to the system resources. For example, the allowed number of the repeated read commands is directly related to the memory resources because the read data according to a plurality of read commands can be temporarily stored in the memory. If the user executes other computer programs during the same time as the data migration then thereby the number of the repeated read commands should be lower therefore the occupied memory resources can be reduced. As long as the read data can be accumulated, the present invention optimized data access management can achieve better efficiency than the prior art.

In additional to the RAID0 disk array, the present invention can be broadened to function in other disk array structures (e.g. RAID0+1, RAID5, and matrix RAID). Please refer to FIG. 21. FIG. 21 illustrates the migration procedure and the zones management in the data migration of different disk array structures. In different disk array structures, the present invention can still utilize the flow 100 shown in FIG. 2 to perform the data migration. Please note, the management of the zones and the groups is slightly different in this case. When the data migration is performed, the present invention still defines each data stripe in the source disk as different groups and still defines each group as being in each zone. Please note the number of data stripes of each zone and each group is shown in FIG. 21. It can be seen that FIG. 21 is very similar to FIG. 16. When the present invention is utilized in different array structures, a group comprises Q data stripes, and the size of each zone can be increased in an index degree (i.e., the size can be increased according to $K^m$). In the RAID disk array, the value Q is equal to the number of the disks of the disk array (the number N). In the RAID0+1 disk array, the value Q is equal to half of the number of the disks of the disk array (because the RAID0+1 disk array must have a even number of disks). In the RAID5 disk array, the value Q is equal to a number, which is the number of the disks of the disk array subtracting 1. In the following disclosure, we utilize a few examples to illustrate the data migration of different disk array structures.

Figure 22:
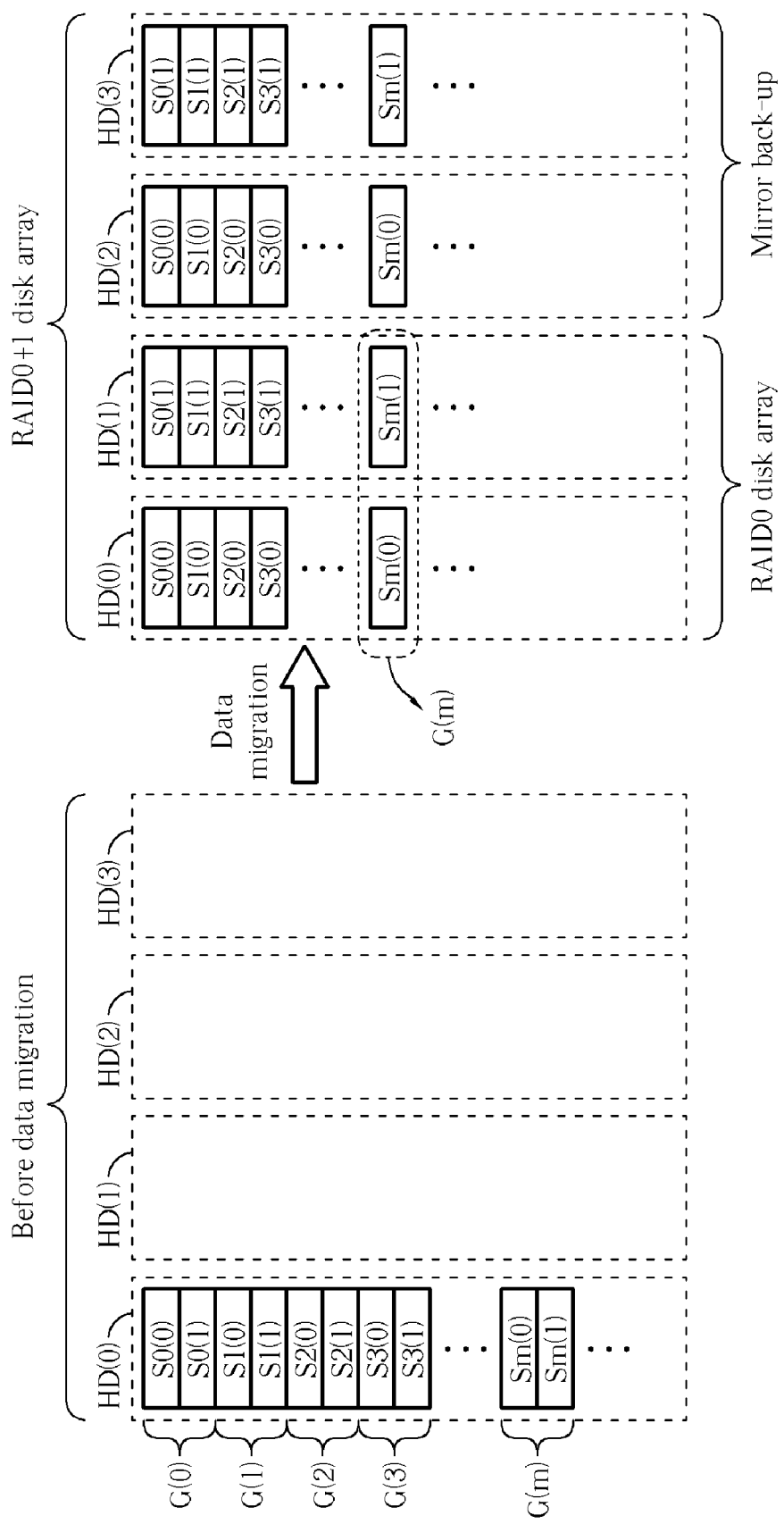
FIG. 22 is a diagram illustrating the data distribution of the RAID0+1 according to the present invention.

Please refer to FIG. 22, which illustrates the data distribution of the data migration of an RAID0+1 disk array having four disks. As shown in FIG. 22, the disk HD(0) is the source disk and the disks HD(1) to HD(3) are added member disks. The RAID0+1 disk array utilizes half the number of disks to form two RAID disk arrays. In addition, one of the RAID0 disk array is a mirror back-up of the other RAID0 disk array. As shown in FIG. 22, the disk HD(0) and the disk HD(1) form a RAID disk array, the other disk HD(2) is utilized to backup the data of the disk HD(0), and the disk HD(3) is utilized to backup the data in the disk HD(1). Therefore, when the present invention is utilized in the RAID0+1 disk array having N disks, wherein N is an even number, this in effect performs data migration in RAID disk array having (N/2) disks because Q=N/2. As the embodiment shown in FIG. 22, when the present invention is utilized in a RAID0+1 disk array having four disks, the present invention defines the data stripes, which can be accessed in parallel or simultaneously in the disks HD(0) and HD(1), in the source disk as the same group. For example, the data stripes S0(0) and S0(1) can be regarded as a group G(0), the following two data stripes S1(0)

and S1(1) can be regarded as a group G(1), and so on. Moreover, the management of the zones can utilize the table of FIG. 21. That is utilizing Q=2 to calculate the size of each zone. In the actual data migration, the flow 100 can be performed directly. But please note that if the step 108 is performed on a certain zone Z(j), the data stripes, which are copied to the previous zone Z(j−1), must be copied to the disk HD(2) as well. Furthermore, the data stripes, which are written from the source disk HD(0) into the disk HD(1), must be written into the disk HD(3) at the same time.

Figure 23:
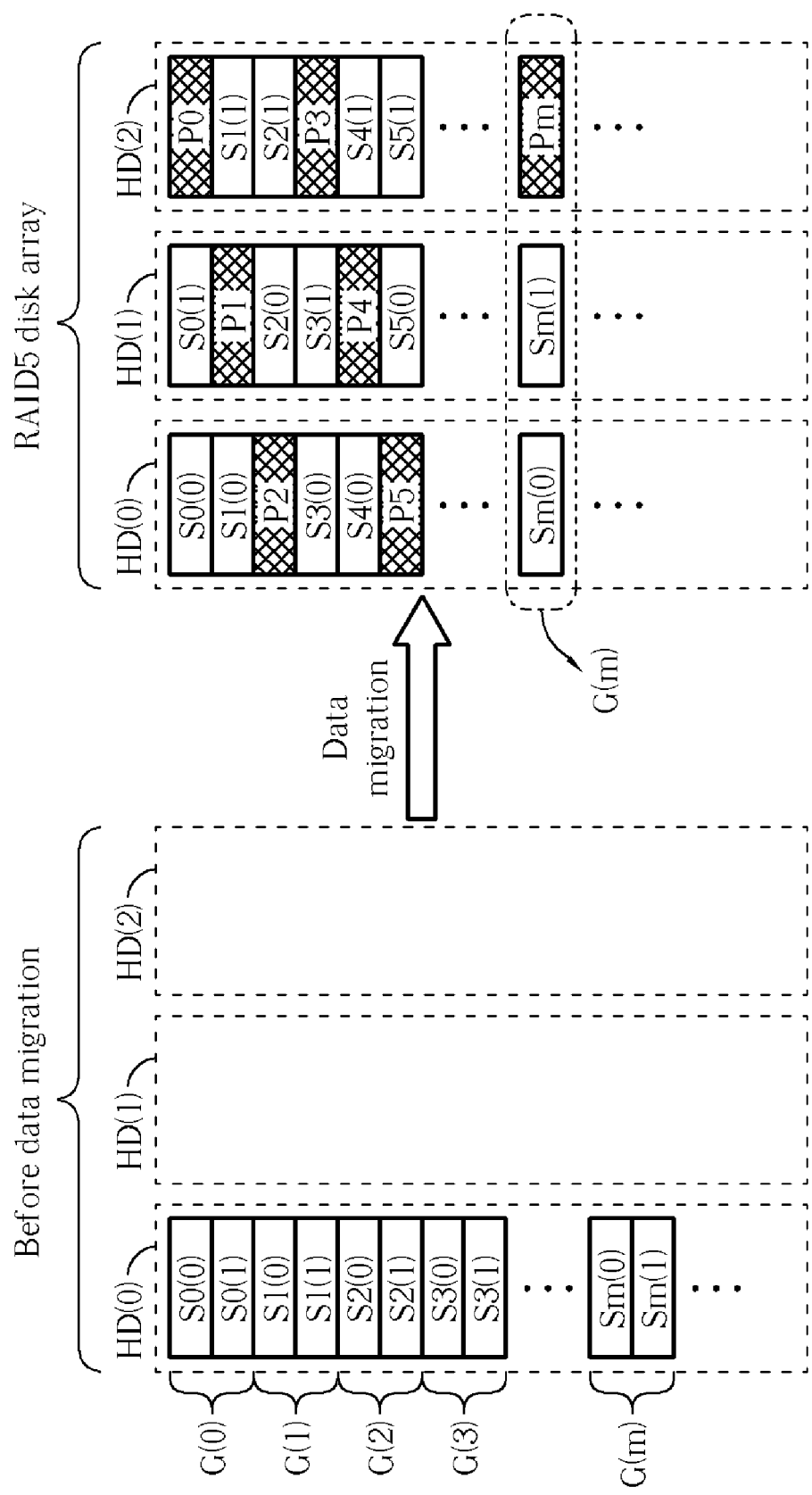
FIG. 23 is a diagram illustrating the data distribution of the RAID5 according to the present invention.

Now utilizing an RAID disk array having three disks as an embodiment to illustrate the data migration of the RAID5 disk array. Please refer to FIG. 23. FIG. 23 illustrates the data distribution of the data migration of the RAID5 disk array having three disks. In addition to the data distribution of the RAID0 disk array, the RAID5 disk array provides the beneficial characteristic of the distribution and calculation of parity data. In other words, in an RAID5 disk array having N disks, every (N−1) parallel data stripes (this means that these data stripes can be accessed simultaneously) can be utilized to calculate a parity data. The (N−1) data stripes and the calculated parity data can be regarded as N data stripes. In addition, the N data stripes are respectively stored in a disk of the disk array. If the N disks have one broken disk, the other (N−1) data stripes stored in the other (N−1) disks can be utilized to calculate the broken data stripe in the broken disk. As shown in FIG. 23, we can utilize two data stripes S0(0) and S0(1) in the source disk to calculate a parity data P0. And the data stripes S0(0), S0(1), and P0 are distributed to each disk HD(0) to HD(2) after the data migration to form three parallel data stripes. Similarly, the next two data stripes S1(0) and S1(1) in the source disk can be utilized to calculate another corresponding parity data P1. And the data stripes S1(0), S1(1), and P(1) are distributed to disks after the data migration. Please note, the present invention does not limit which disk stores each data stripe. The present invention can be embodied in many ways. For example, in the case in FIG. 23, the parity data P1 is distributed to the disk HD(1). Therefore, the parity data P2 can be calculated according to the data stripes S2(0) and S2(1) and the data stripes S2(0), S2(1), and P2 can be parallel data stripes in each disk after the data migration.

Figure 24:
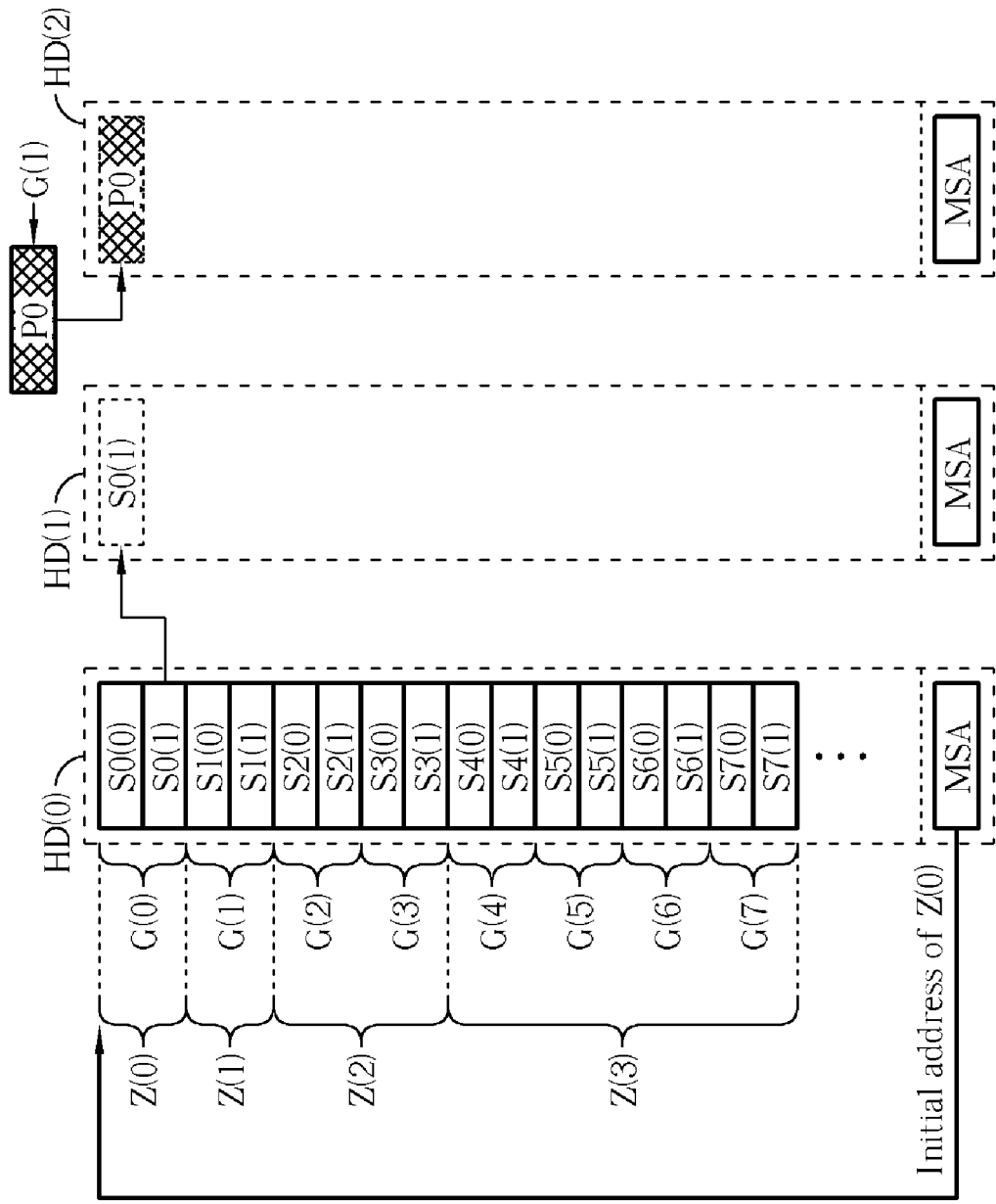
FIG. 24 to FIG. 26 are diagrams illustrating data migrations of the disk array shown in FIG. 23 according to the present invention.
Figure 25:
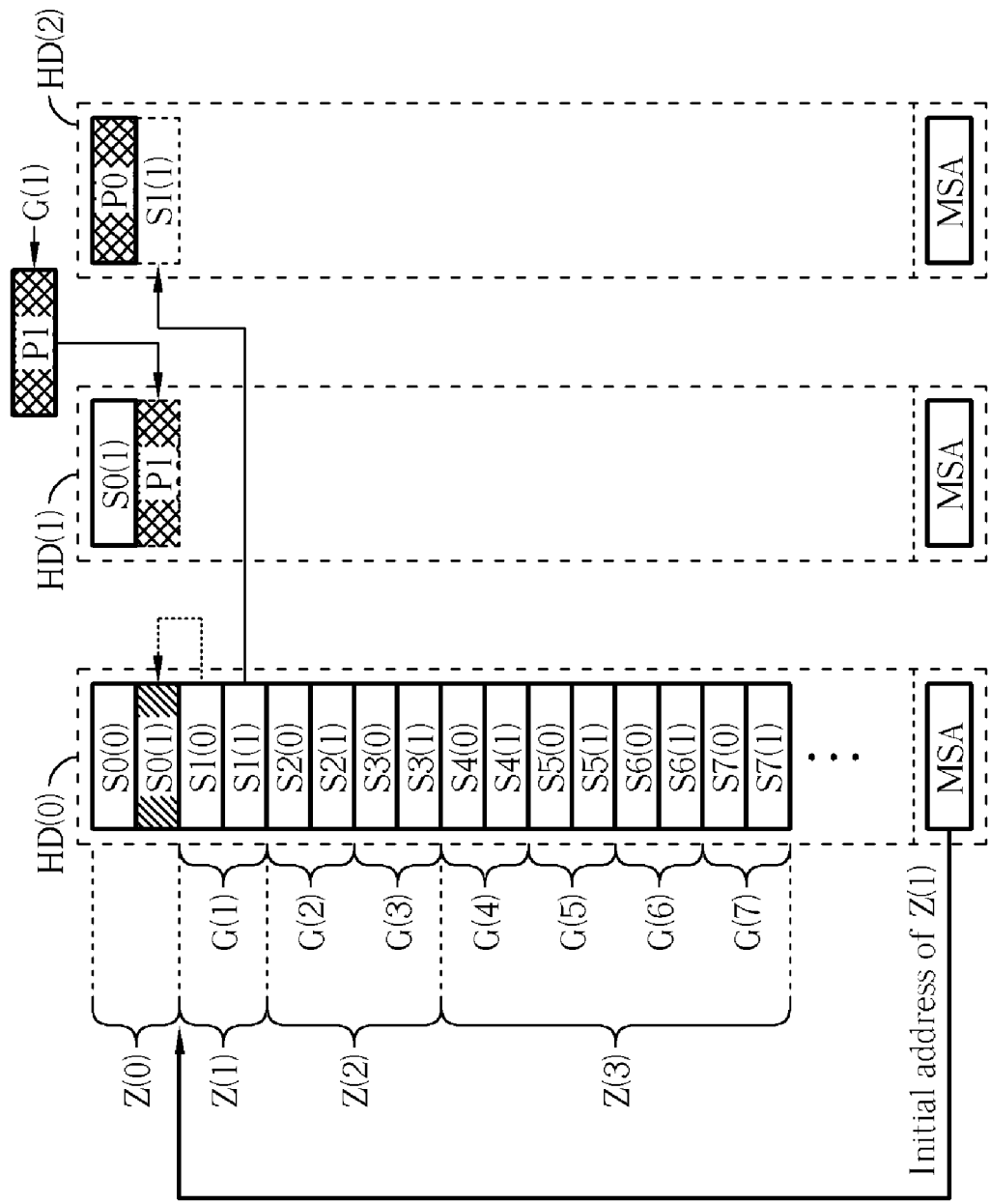
Figure 26:
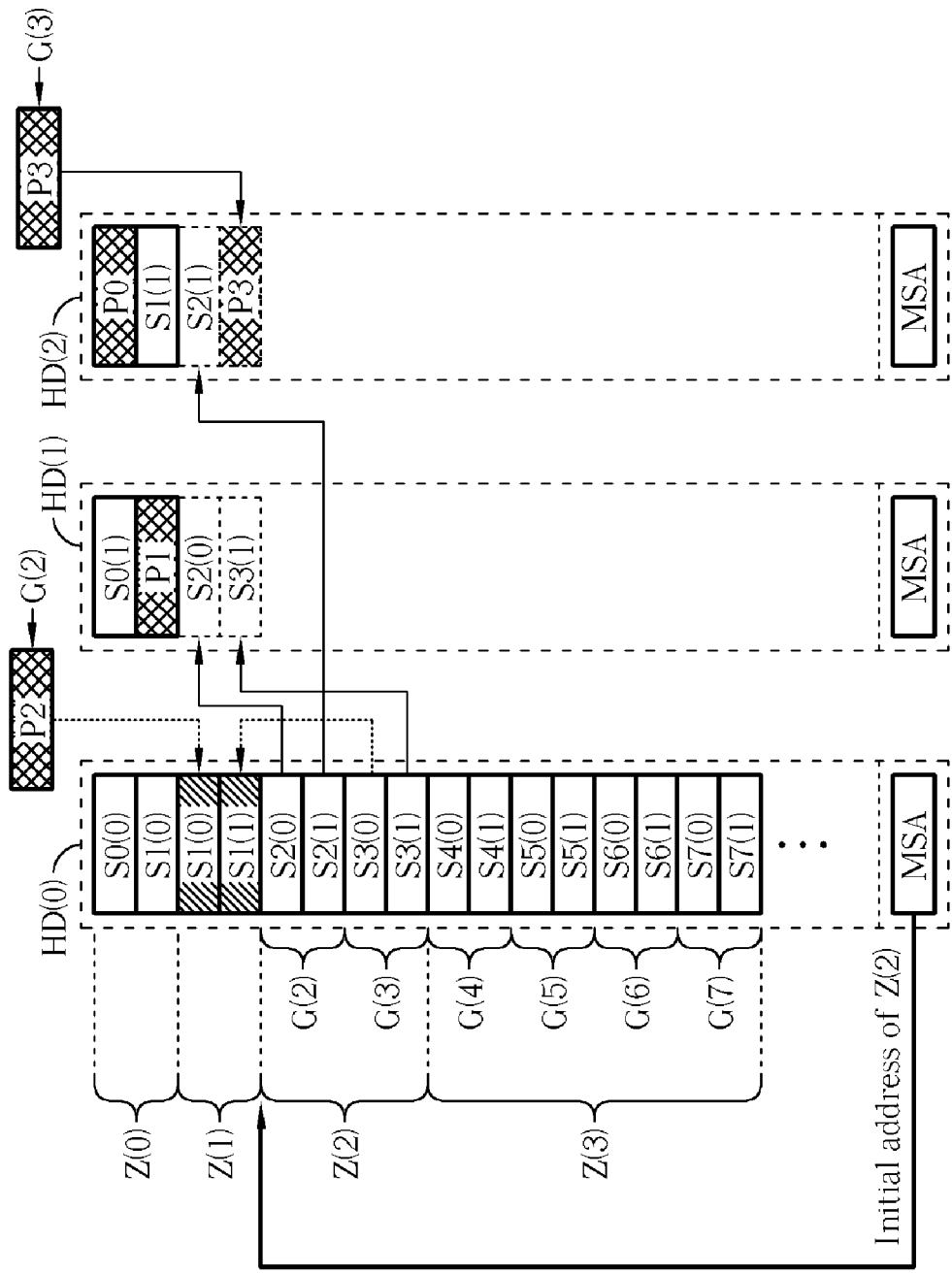

When the present invention is utilized in an RAID5 disk array having N disks, because every (N−1) data stripes can calculate one parity data, the (N−1) data stripes can be regarded as a same group. That is the reason that Q=(N−1) in FIG. 21. In the case in FIG. 23, an RAID5 disk array having three disks is utilized; every two data stripes can be regarded as the same group. Therefore, we can utilize the formula shown in FIG. 21 to calculate the size of each zone in the data migration. When the data migration is actually performed, the present invention can utilize the flow 100 shown in FIG. 2 to perform the data migration on RAID5 disk array. In the whole flow 100, only step 108 has to be changed a little. That is, when the data of each group in the zone Z(j) is migrated, we have to first calculate corresponding parity data according to the data stripes of the same group, and respectively write these data stripes of the same group and the parity data into each disk, wherein one data stripe is written in the previous zone Z(j−1). Following the embodiment in FIG. 23, please refer to FIG. 24 to FIG. 26. FIG. 24 to FIG. 26 are diagrams of data migration of a RAID5 disk array having three disks. As shown in FIG. 24, at the beginning of the data migration, the initial data MSA points to the zone Z(0). After the parity data P0 is calculated, the data stripe S0(1) and the parity data P0 can be respectively copied to the disks HD(1) and HD(2). Therefore, the data migration of the zone Z(0) is completed.

As shown in FIG. 25, the initial data MSA is updated to point to the zone Z(1). According to the data stripe S1(0), after the parity data P1 is calculated according to the data stripes S1(0) and S1(1), the parity data P1, and the data stripes S1(0) and S1(1) can be written into each disk HD(0) to HD(2), wherein the data stripe S1(0) can be written into the zone Z(0).

As shown in FIG. 26, after the data migration of the zone Z(1) is completed the initial data MSA is further updated to point to the zone Z(2); the zone Z(1) becomes a rewritable zone. This makes the original two data stripes of the zone Z(1) correspond to two groups of the zone Z(2). After the parity data P2 is calculated according to each data stripe of the group G(2), each data stripe of the group G(2) and the parity data P2 can be written into each disk. According to the RAID5 disk array the parity data P2 can overwrite the data stripe S1(0) of the zone Z(1). Similarly, after the parity data P3 is calculated according to each data stripe of the group G(3), the data stripes S3(0) and S3(1) of the group G(3) and the parity data P3 can be respectively written into each disk. Similarly, the data stripe S3(0) can overwrite the data stripe S1(1) in the zone Z(2). Therefore, following the above-mentioned theory, the whole data migration of the RAID5 disk array can be performed completely. From the above-mentioned discussion in FIG. 24 to FIG. 26, the present invention can be utilized in the RAID5 disk array.

Figure 27:
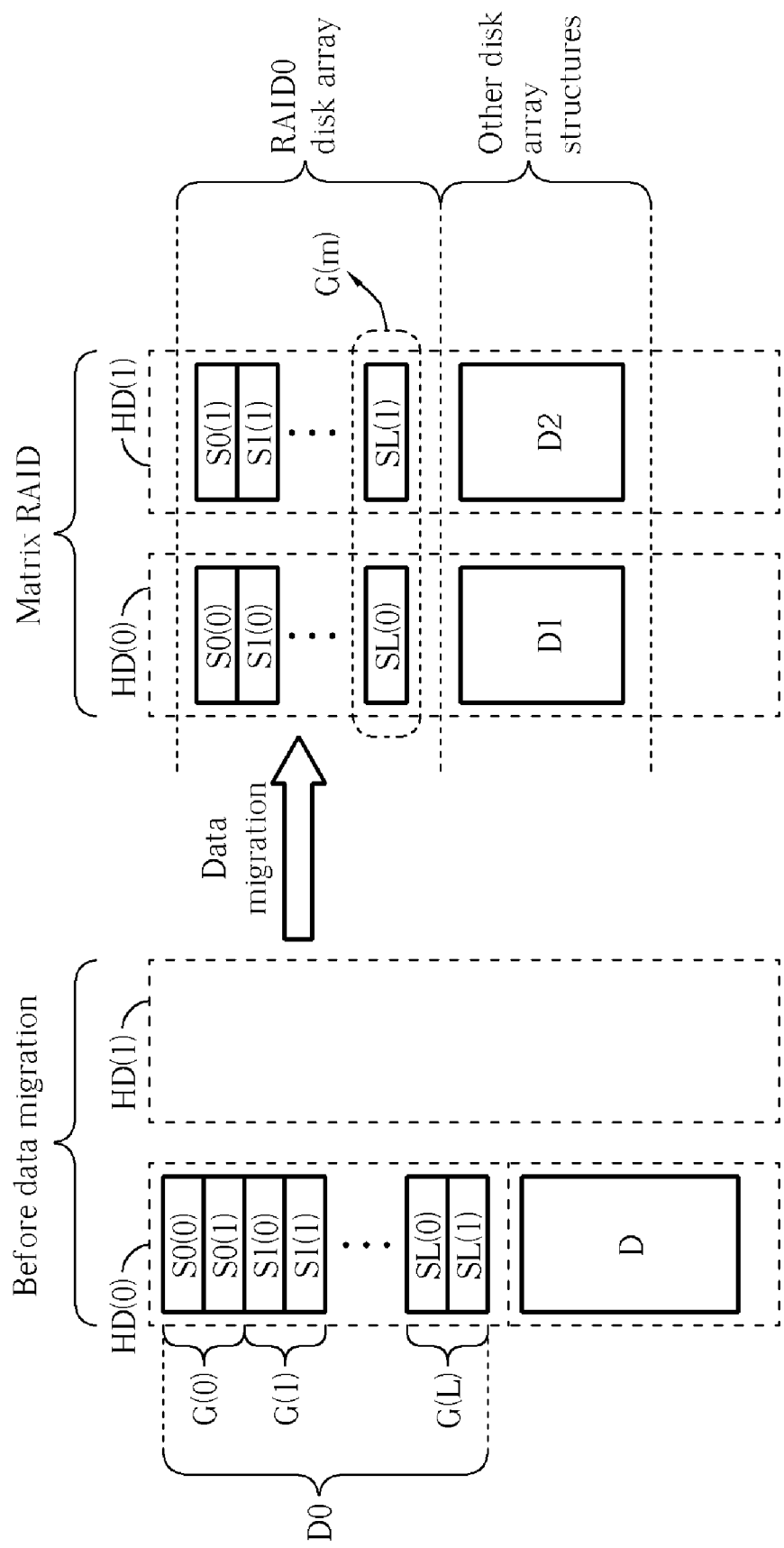
FIG. 27 is a diagram illustrating the data distribution of a matrix RAID according to the present invention.

Please refer to FIG. 27, which is a diagram of the data distribution of the data migration of a matrix RAID. As shown in FIG. 27, the disk HD(0) is the source disk and the disk HD(1) is the member disk. In the matrix RAID, the memory spaces of the disk array can be arranged as different disk array structures. For example, the data D0 originally stored in the source disk HD(0) are distributed to each disk according to the RAID0 disk array. That is, the data is divided into data stripes and arranged into the disks HD(0) and HD(1). In addition, the other data D in the source disk are divided into the data D1 and D2 and respectively stored in the disk HD(0) and HD(1) according other disk array structure (e.g. RAID0+1 disk array). When the data migration of the matrix RAID is performed, the present invention can be utilized to migrate the data distributed according to the RAID0 disk array. In the above-mentioned situation, the formula shown in FIG. 16 can be utilized to manage the data migration procedure. Moreover, the data migration can be performed through the flow 100 shown in FIG. 2.

To sum up, the present invention claims a data migration procedure management/record and optimized data access management utilized to raise the efficiency of the data migration of the disk array. Furthermore, the present invention can raise the data safety of the data migration. Even when the data migration is interrupted; the data will not be lost or otherwise corrupted. In addition, the data migration can be recovered after an interruption. Consider the data migration management/record, the present invention defines the data stripes to be migrated as being in each zone, where each zone comprises a plurality of data stripes to be migrated to different disks. Then the present invention performs the data migration by a unit of zone. Furthermore, the present invention stores an initial data (i.e., the initial address of the zone to be migrated) in each disk of the disk array to store the procedure of the data migration. This provides the present invention with the capability to continue the data migration when a recovery is necessary. When the data migration of a certain zone Z(j) is being performed, the initial data stores the initial address of the zone. When the data of the zone Z(j). After all the data of the zone Z(j) are copied to corresponding disks, the initial data can be updated to point to the next zone Z(j+1). In addition, the data stripe in the zone Z(j+1), which is to be migrated to the source disk, can overwrite the previous zone Z(j+1). Moreover, the other data stripes, which are to be migrated to the other disks, can be copied to each corresponding disk. When the data stripes in the zone Z(j+1) are migrated they are also copied to other disks or to the previous zone of the source disk; the data stripes of the zone Z(j+1) are not overwritten or changed. In other words, even if the data migration is interrupted when the zone Z(j+1) is being migrated, the data of the zone Z(j+1) is not lost or damaged (i.e., corrupted). Therefore, when the data migration is recovered, the data migration can be recovered from the zone Z(j+1). Furthermore, according to the present invention data migration procedure management, the zone Z(j+1) only comprises a part of data stripes to be copied to the zone Z(j); other data stripes have to be written into other disks. Therefore, the size of the zone Z(j+1) can be larger than the size of the previous zone Z(j) and the size can be increased in an index degree. The increased size can reduce the amount of updating of the initial address. This can cooperate with the present invention optimized data access management so that each read/write-in command can be utilized to accumulate more data and raise the efficiency of the data migration. Furthermore, the present invention can not only perform the data migration on the RAID0 disk array but also perform the data migration on other disk array structures (such as RAID0+1, RAID5, and matrix RAID). In contrast to the prior art, the present invention can raise the efficiency; reduce the time consumption of the data migration and the computer resources in the situation of enduring the data safety. In addition, the present invention can be utilized widely in different disk array structures.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for data migration of a disk array, the disk array comprising a source disk and at least a member disk, and a total number of the disks in the disk array equaling to N, the method utilized to separately store a data to be migrated from the source disk into each disk of the disk array, the method comprising:

dividing the data to be migrated into a plurality of data stripes;

dividing the plurality of data stripes of the source disk into a plurality of zones, wherein a number of data stripes of a first zone Z(0) of the plurality of zones is N, a number of data stripes of a second zone Z(j) of the plurality of zones is $(N-1) \times (N^j)$ wherein j is equal to 1, a number of data stripes of a third zone Z(j) of the plurality of zones is $(N-1) \times (N^j)$ wherein j is equal to 2, and a number of data stripes of a $M^{th}$ zone Z(j) of the plurality of zones is $(N-1) \times (N^j)$ wherein M is a natural number equal to or greater than 4 and j is equal to M−1;

performing a data migration operation on data stripes of a one zone of the plurality of zones from the source disk to all disks in the disk array including the source disk and the at least one member disk, wherein the one zone corresponds to an initial data; and updating the initial data with an initial address of a next zone immediately following after the one zone only when the data stripes of the one zone are completely migrated, wherein the data migration operation of the data stripes of the first zone Z(0) is firstly completed.

2. The method of claim 1, further comprising:
storing the initial data in the source disk and each member disk.

3. The method of claim 1, further comprising:
when performing the data migration operation on the data stripes of the one zone, finding out the one zone according to the initial data when reinitializing the data migration operation and writing each data stripe of the one zone into a corresponding member disk or the source disk.

4. The method of claim 1, wherein each disk is capable of receiving a reading command to read data whose amount is not more than a threshold and capable of receiving a writing command to write data into the disk, and the method further comprises:

when performing the data migration operation on the data stripes of the one zone, if the amount of all the data stripes in the migration zone is more than the threshold, then first utilizing a plurality of reading commands to read the data stripes to be migrated in the source disk and then utilizing the writing commands to write the read data into each disk of the disk array.

5. A computer system comprising:

a disk array comprising a source disk and at least a member disk, each disk being utilized to provide a memory space to store data, a total number of the disks in the disk array equaling to N, and N being a natural number greater than 1; a central processing unit for controlling an operation of the computer system; and a memory capable of storing a data migration program; wherein the central processing unit is capable of executing the data migration program to separately store a data to be migrated of the source disk into each disk of the disk array, and the migration program comprises:

an arranging procedure, wherein the central processing unit executes the arranging procedure to divide the data to be migrated in the source disk into a plurality of data stripes and divides the plurality of data stripes of the source disk into a plurality of zones, wherein number of data stripes of a first zone Z(0) of the plurality of zones is N, a number of data stripes in a second zone Z(j) of the plurality of zones is $(N-1) \times (N^j)$ wherein j is equal to 1, a number of data stripes of a third zone Z(j) of the plurality of zones is $(N-1) \times (N^j)$ wherein j is equal to 2, and a number of data stripes of a $M^{th}$ zone Z(j) of the plurality of zones is $(N-1) \times (N^j)$ wherein M is a natural number equal to or greater than 4 and j is equal to M−1;

a zone migration procedure, wherein the central processing unit executes the zone migration procedure to perform a data migration operation on data stripes of a one zone of the plurality of zones from the source disk to all disks in the disk array including the source disk and the at least one member disk, wherein the one zone corresponds to an initial data, and wherein the data migration operation of the data stripes of the first zone Z(0) is firstly completed; and an initial data updating procedure, wherein the central processing unit executes the initial data updating procedure to update the initial data with an initial address of a next zone immediately following after the one zone only when the data stripes of the one zone are completely migrated.

6. The computer system of claim 5, wherein the central processing unit executes a storing procedure to further store the initial data into the source disk and each member disk.

7. The computer system of claim 5, wherein the data migration program further comprise a recovering procedure, and when the central processing unit executes the zone migration procedure, the central processing unit executes the recovering procedure when re-executing the data migration program to find out the one zone according to the initial data and writes each data stripe in the migration zone into a corresponding member disk or the source disk.

8. The computer system of claim 5, wherein each disk is capable of receiving a reading command to read data whose amount is not more than a threshold from the disk and receiving a writing command to write the data into the disk, and the migration program further comprises a reading/writing managing procedure, when the central processing unit executes the zone migration procedure, the central processing unit executes the reading/writing managing procedure to determine whether the amount of all data stripes of the one zone is more than the threshold and if the amount of all data stripes of the one zone is more than the threshold, the central processing unit is capable of utilizing a plurality of reading commands to read the data stripes to be migrated from the source disk and simultaneously utilizing writing commands to write the read data into each disk of the disk array.

9. A method for data migration of a disk array, the disk array comprising a source disk and at least a member disk, and a total number of the disks in the disk array equaling to N, the method utilized to separately store a data to be migrated from the source disk into each disk of the disk array, the method comprising:

dividing the data to be migrated into a plurality of data stripes;

setting a threshold value equal to a predetermined percentage of a size of the source disk;

dividing the plurality of data stripes of the source disk into a plurality of zones, wherein any one zone is smaller or equal to the size of the threshold value, and a number of data stripes of a first zone $Z(0)$ of the plurality of zones is N, a number of data stripes of a second zone $Z(j)$ of the plurality of zones is $(N-1)*(N^j)$ wherein j is equal to 1, a number of data stripes of a third zone $Z(j)$ of the plurality of zones is equal to $(N-1) \times (N^j)$ wherein j is equal to 2, and a number of data stripes of a $M^{th}$ zone $Z(j)$ of the plurality of zones is equal to $(N-1) \times (N^j)$ wherein M is a natural number equal to or greater than 4 and j is equal to M−1;

performing a data migration operation on data stripes of a one zone of the plurality of zones from the source disk to all disks in the disk array including the source disk and the at least one member disk, wherein the one zone corresponds to an initial data, and wherein the data migration operation of the data stripes of the first zone $Z(0)$ is firstly completed; and updating the initial data with an initial address of a next zone immediately following after the one zone only when the data stripes of the one zone are completely migrated.

10. The method of claim 9 wherein the threshold value is 1% of the size of the source disk.

* * * * *